(12) United States Patent
Scott et al.

(10) Patent No.: US 8,086,591 B2
(45) Date of Patent: Dec. 27, 2011

(54) COMBINING DOMAIN-TUNED SEARCH SYSTEMS

(75) Inventors: Matthew R. Scott, Beijing (CN); Jing Zhao, Beijing (CN); Raman Chandrasekar, Seattle, WA (US); Dean A. Slawson, Beijing (CN)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/130,089

(22) Filed: May 30, 2008

(65) Prior Publication Data
US 2008/0243838 A1 Oct. 2, 2008

Related U.S. Application Data

(63) Continuation-in-part of application No. 10/778,498, filed on Feb. 13, 2004, now Pat. No. 7,392,278.

(60) Provisional application No. 60/538,838, filed on Jan. 23, 2004.

(51) Int. Cl.
*G06F 7/00* (2006.01)
*G06F 17/00* (2006.01)

(52) U.S. Cl. .................. 707/708; 707/716; 707/748

(58) Field of Classification Search ........... 707/999.003, 707/999.004, 999.005, 999.007, 708, 716, 707/728, 748; 715/700
See application file for complete search history.

(56) References Cited

U.S. PATENT DOCUMENTS

| | | | |
|---|---|---|---|
| 6,418,433 B1 | 7/2002 | Chakrabarti et al. | |
| 6,578,032 B1 | 6/2003 | Chandrasekar et al. | |
| 6,665,658 B1 | 12/2003 | DaCosta et al. | |
| 6,691,108 B2 | 2/2004 | Li | |
| 6,714,934 B1 | 3/2004 | Fordham | |
| 7,082,428 B1 * | 7/2006 | Denny et al. | 707/999.004 |
| 7,165,069 B1 * | 1/2007 | Kahle et al. | 707/999.01 |
| 7,272,597 B2 | 9/2007 | Chowdhury et al. | |
| 7,299,270 B2 * | 11/2007 | Kolluri et al. | 707/999.003 |
| 7,299,470 B2 * | 11/2007 | Curtis | 719/312 |
| 2002/0087526 A1 * | 7/2002 | Rao | 707/3 |
| 2002/0194161 A1 | 12/2002 | McNamee et al. | |
| 2004/0205049 A1 | 10/2004 | Aggarwal | |
| 2005/0165753 A1 | 7/2005 | Chen et al. | |
| 2006/0161535 A1 * | 7/2006 | Holbrook | 707/3 |
| 2007/0043736 A1 | 2/2007 | Jain | |

OTHER PUBLICATIONS

Chakrabarti, et al. Focused Crawling: a New Approach to Topic-Specific Web Resource Discovery http://www.cse.iitb.ac.in/~soumen/doc/www1999f/pdf/www1999f.pdf. Last accessed Feb 7, 2008, 18 pages.

Xiang, et al. Coordination and Communication among Topic Specific Search Agents, in Third International Conference on Natural Computation (ICNC 2007), 0-7695-2875-9/07 IEEE http://ieeexplore.ieee.org/iel5/4304828/4304829/04304967.pdf. Last accessed Feb. 6, 2008, 5 pages.

(Continued)

*Primary Examiner* — Vincent Boccio
(74) *Attorney, Agent, or Firm* — Lee & Hayes, PLLC

(57) ABSTRACT

The claimed subject matter provides systems and/or techniques that effectuate combining domain-tuned search systems. The system can include mechanisms that obtain queries, written descriptions, or illustrative web-pages regarding a particular area of interest, and generate a definition related to the area of interest. The definition contains a list of paths with associated weights employed to identify an pre-established first domain-tuned search system related to the area of interest. The first domain-tuned search system thereafter can be combined with a second domain-tuned search system related to another area of interest and presented to a user for utilization in re-ranking generic search results to be specific to the first and second domains of interest if combined, or to only the first domain if weights for the second domain are logically subtracted.

20 Claims, 22 Drawing Sheets

OTHER PUBLICATIONS

Liu, et al. Mining Topic-Specific Concepts and Definitions on the Web, in WWW 2003, May 20-24, 2003, Budapest, Hungary. ACM 1-58113-680-3/03/0005. http://www.cs.uic.edu/~liub/publications/WWW-2003.pdf. Last accessed Feb. 7, 2008, 10 pages.

Chandrasekar, et al. Subwebs for Specialized Search, in SIGIR'04, Jul. 25-29, 2004, Sheffield, South Yorkshire, UK. ACM 1-58113-881-4/04/0007. Last accessed Feb. 6, 2008, 2 pages.

* cited by examiner

FIG. 16

COMBINING DOMAIN-TUNED SEARCH SYSTEMS

REFERENCE TO RELATED APPLICATIONS

This application is a continuation in part of U.S. application Ser. No. 10/778,498, filed Feb. 13, 2004, entitled BUILDING AND USING SUBWEBS FOR FOCUSED SEARCH which claims the benefit of U.S. Provisional Patent Application Ser. No. 60/538,838 filed Jan. 23, 2004, and entitled BUILDING SUBWEBS, the disclosures of which are hereby incorporated by reference as if fully set forth herein.

TECHNICAL FIELD

The present invention relates generally to Internet and/or intranet searching, and more particularly to systems and methods that facilitate topical categorization or biasing of domains and/or paths, and that further facilitate searching of such categorizations.

BACKGROUND

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wired or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address and/or an intranet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and for web addresses a suffix (e.g., com, org, net, gov and edu) that identifies the type of organization.

In some instances, the user knows, a priori, the name of the site or server, and/or the URL to the site or server that the user desires to access. In such situations, the user can access the site, as described above, via entering the URL in the address bar and connecting to the site. However, in most instances, the user does not know the URL or the site name. Instead, the user employs a search function to facilitate locating a particular site based on keywords provided by the user. Presently there exist two disparate types of search functions—a domain-specific search function whose search is confined to a particular domain or site (e.g., www.domain.com), and a general search function (e.g. a general search engine) that searches the entire World Wide Web (or intranet) for sites related to the provided keywords. For example, the user may desire to locate sites that contain information regarding a computer virus. A first option would be to go directly to a particular domain (e.g., www.computervirus.com) that specializes in information relating to computer viruses, and search for documents (e.g., www.computervirus.com/virus1.htm) within that domain containing relevant information. More specifically, the user will enter the URL www.computervirus.com into the address bar of a web browser and be directed to such site. On that site the user can enter keywords into a search dialog box, and the search will return documents within the domain www.computervirus.com that the user can select. However, relevant information that lies outside of that domain will not be returned to the user. For instance, a relevant page with a domain www.compvirus.com would not be returned, as it does not lie within the domain www.computervirus.com. Thus, for the user to obtain relevant data outside of the domain www.computervirus.com, he must know URL addresses of other domains that contain information and search such particular domains.

Alternatively, the user can enter keywords into a general search engine, which will search the entirety of the World Wide Web or other collection of sites (e.g., intranet) and return sites that it determines to be related to the keywords. Often, however, the general search engine will return a substantial number of sites that are wholly unrelated to the particular interests of the user. For example, if the user searched using the keyword "virus", rather than obtaining information related only to computer viruses he or she would receive information relating to biological viruses as well as computer viruses. The user can thereafter scroll through a plurality of returned sites and attempt to determine if they are related to user interests. Scrolling through returned results can be extremely time consuming and frustrating to the user, as general search engines can return a substantial number of sites when performing a search. The user can attempt to narrow the search via utilizing a combination of Boolean operators, but it can be difficult to construct an appropriate Boolean search that will result in a return of sites containing only relevant information. Furthermore, some conventional general search engines attempt to infer what a user is searching for based upon the keywords. For instance, if a user entered the term "virus" into the general search engine, the search engine can return a plurality of sites together with suggestions for narrowing the search. More particularly, the search engine could return a plurality of suggestions, such as "do you want to search for a computer virus?", "do you want to search for a biological virus?", etc. For many searches (especially for more detailed and specific searches), this conventional method requires selecting a continuing hierarchy of suggested searches, and the returned sites may still lack relevant information. Furthermore, the user may desire to locate a site that will not be encompassed by the returned search suggestions.

Accordingly, there exists a strong need in the art for a searching system and/or methodology that provides focused results as can be found in domain-specific searching without sacrificing benefits related to a search conducted via a general search engine.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention utilizes a grouping of a subpopulation of domains and/or paths (collectively referred to hereinafter as simply "sites") that are related to a particular topic, a subset of individuals, or any other suitable grouping of sites to facilitate improvements in connection with searching the Internet. These sites thereinafter contain document pages that can be retrieved by a user. For example, the subpopulation of sites can be selected and grouped based upon an age group of individuals that typically view such sites, political affiliation of individuals that view such sites, geographic location of individuals that view such sites, religion of individuals that view such sites, etc. For instance, the sub-population of related sites can be relevant to a particular topic that is desirably searched by a user. More particularly, users between ages of 10 to 20 are likely to search for disparate sites than users between ages 40 and 50, and individuals with a first political affiliation typically search for differing sites than individuals with an opposing political affiliation. In another example, a collection of sites (e.g., the Internet) can be conceptually viewed as a plurality of topics, wherein a topic is defined by sites within the collection of sites related to that topic. When searching for information related to a particular topic, it would be beneficial to possess a listing of sites already found to be relevant to that topic prior to performing the search. The present invention describes a system and/or methodology for compiling a listing of sites that can be grouped according to topic, age of an individual, political affiliation of an individual, geographic location of an individual, etc., and further discloses a system and/or methodology for assigning relevance weights to each of the listed sites. For sake of readability, the term "topic" hereinafter will be employed to refer not only to a conventional definition of "topic", but also to other groupings of related sites (e.g., sites grouped according to relevance to a particular age range, geographic location, . . . ). This collection of relevance-weighted sites that are related to a particular topic or group is hereafter referred to as a subweb. Subwebs can be modified to remain current when information on the Internet is altered, when user preferences change, or for any other suitable reason. Furthermore, the subwebs can be stored (e.g. on a hard drive, CD, DVD, . . . ), duplicated, and transferred between users.

In accordance with one aspect of the present invention, a subweb will include a list of sites related to a topic that is represented by the subweb, and each site within the subweb will be assigned a biased weight according to relevance of the site to the topic. Thus, for example, sites found highly relevant to a topic represented by a subweb will be assigned a greater relevance weight than sites found to be less relevant to the topic. Thereafter, a general search engine can utilize one or more topic-specific subwebs to facilitate focusing of a search. More particularly, one or more subwebs can be selected to appropriately focus a search, and a search query can be entered into a general search engine. Thereafter, results of the search can be determined based upon conventional search engine ranking systems together with the relevance weight assigned to the sites that define the subweb. For instance, sites returned by the search engine that exist within the subweb will receive a boost in ranking corresponding to an assigned weighted relevance ranking. In accordance with another aspect of the present invention, a plurality of sites that would be returned from a general search engine are discarded because they are not contained by the subweb that was selected to focus the search. This invention can also be used to present classified/clustered search engine return results to a user—for a given return set, a plurality of subsets of sites that are respectively part of particular disparate subwebs can be binned. For example, a subweb related to health and medicine and a subweb related to computers can be existent and employed in connection with a search engine. If a query of "virus" is entered into the search engine, results related to medicine and results related to computers can be classified and displayed to a user separately (e.g., sites within the health and medicine subweb and sites within the computer subweb can be grouped accordingly).

In accordance with one aspect of the present invention, subwebs can be created using a list of query terms that are related to a particular topic. For example, queries from a query log related to a topic-specific web site can be employed as the list of query terms. Thereafter, a general search engine can be utilized to perform multiple searches while employing several disparate topic-related query terms. Because the query terms are related to a particular topic, web sites that are relevant to the topic will be returned multiple times for disparate query terms (e.g. a same web site will be returned when utilizing disparate query terms). Furthermore, the present invention contemplates reviewing neighboring sites and determining their relevance with respect to the topic of interest (e.g., sites that are in-linked and out-linked to/from the sites returned in the search). Weights that are indicative of relevance of a particular site to the topic are assigned to sites returned within the search. The weights are computed based at least in part upon a number of times the site and/or neighboring site was returned when utilizing a plurality of different topic-related search terms. Furthermore, subwebs can be created based at least in part upon properties of users. For instance, if age/gender/location/etc. of search engine users are known, subwebs can be built for such age/gender/location/etc. characteristics. More particularly, a subweb can be built that is employed by 20-30 year old males who are currently residing in Texas. Moreover, weights corresponding to sites within the subweb can be based at least in part upon an individual user's previous search or browsing history, contents of results pages, etc.

In accordance with another aspect of the present invention, a web crawler can utilize subwebs in connection with determining which pages to visit on the World Wide Web. For example, a web crawler will more frequently visit pages within a popular subweb when compared to pages that are within unpopular subwebs or pages that are not utilized in connection with a subweb at all.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 16 illustrates results returned from various search engines compared to results returned from a subweb-focused search in accordance with an aspect of the present invention.

DETAILED DESCRIPTION

Figure 1:
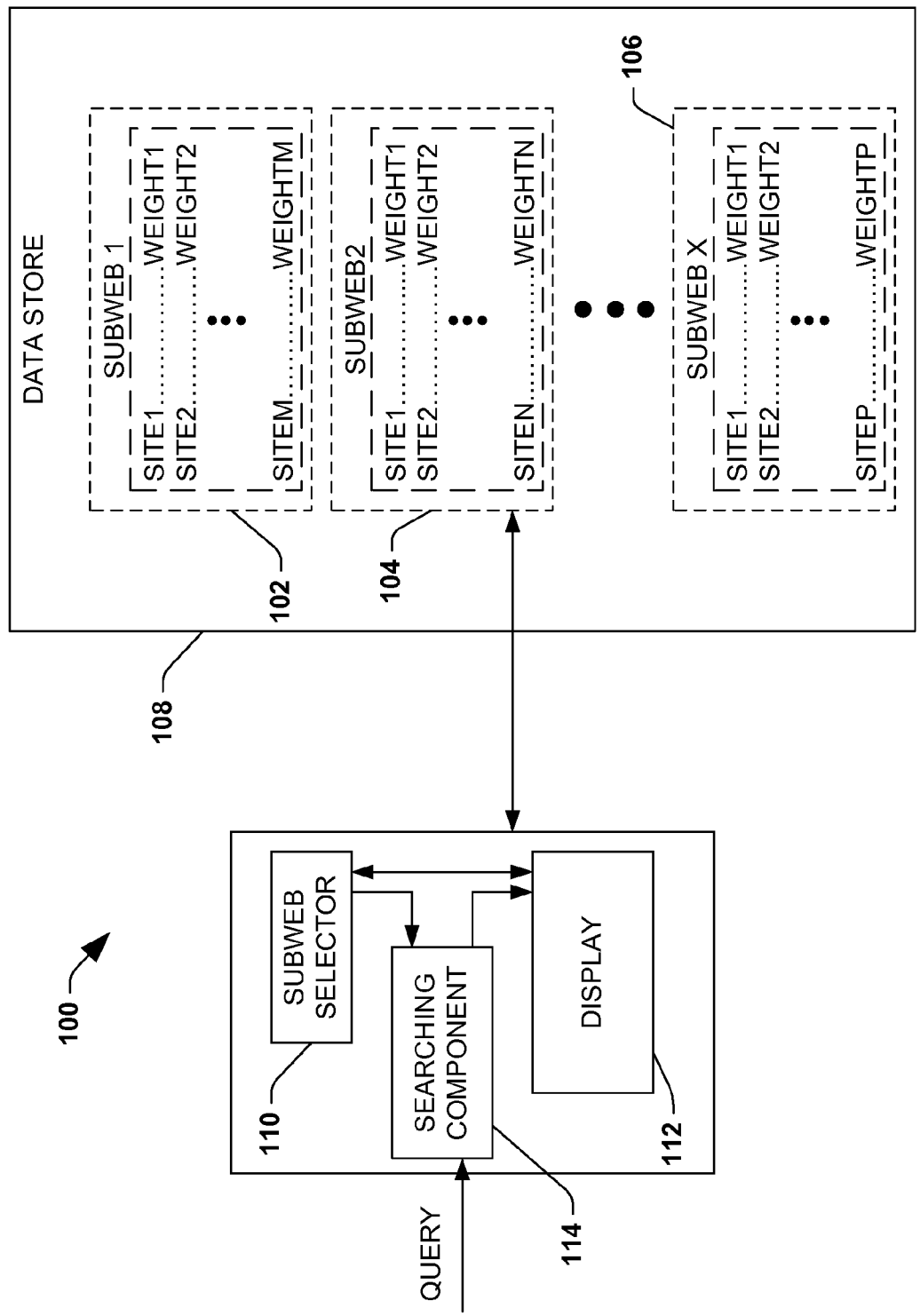
FIG. 1 is a block diagram of a system that facilitates improved searching in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g. data from one component interacting with another component in a local system, distributed system, and/or across a network such as the Internet with other systems via the signal).

Turning now to FIG. 1, a system 100 that facilitates improved accuracy and efficiency when performing a search over a collection of sites is illustrated. The system 100 is utilized in connection with searching the Internet for information related to a user query. It is understood, however, that the Internet is simply an exemplary collection of sites that can be searched in accordance with the present invention. Any collection of sites, whether or not on the Internet, an intranet or elsewhere, can be searched utilizing the present invention. For instance, a collection of sites stored on a client hard drive can be searched in connection with the present invention. The present invention improves upon conventional searching techniques via conceptually partitioning a plurality of domains (e.g., www.domain.com), paths (e.g., www.domain.com/paths), clusters of domains and/or paths, and other suitable sites located on the Internet into neighborhoods of related sites or subwebs 102-106 that are stored within a data store 108. Each subweb 102-106 is related to a particular topic of interest to the user, and thus includes a plurality of sites (e.g., domains, paths, clusters of domains and/or paths, . . . ) that are relevant to that topic. For example, the subweb 102 can be related to automobiles; thus, each site included within the subweb 102 will all be relevant to the topic of automobiles. It is to be understood that the Internet (or any other collection of sites) can be seen as a collection of any number of topics, and that two or more topics can include related information. Accordingly, disparate subwebs that represent related topics can include a plurality of same sites. Moreover, one subweb can entirely encompass another subweb. The subwebs 102-106 are shown as entirely separate from one another for illustration purposes only, and such separation should not be interpreted to limit the scope of the present invention. Furthermore, subwebs can be created based at least in part upon characteristics of search engine users. For example, subwebs containing sites typically searched by individuals within a particular age range can be created. Other user characteristics, such as user location, user sex, political affiliation of a user, ethnicity, etc. can also be utilized to create a subweb that contains sites that are related to such user characteristics.

The sites within the subwebs 102-106 are weight biased according to their relevance to topics and/or user characteristics that the subwebs 102-106 represent. For instance, subweb 104 includes N sites and N weights, where N is an integer. Each site is associated with a weight that, when reviewed collectively with other weights within the subweb 104, can illustrate relevance of a site to the topic of the subweb 104. More particularly, within the subweb 104 site1 is assigned a weight of weight1, and site2 is assigned a weight of weight2. Thus, a determination can be made regarding which of the two sites has higher relevance to the topic of subweb 104 via comparing weight1 to weight2. Moreover, the subwebs 102-106 can be stored within a database as part of a user profile and/or as independent objects. For example, the data store 108 can be accessible via a web site. Upon visiting the website and entering user-identifying information (e.g., username and password), the subwebs 102-106 can be retrieved and employed in connection with a search. Also, the subwebs 102-106 can be stored as objects and transferred to disparate users for their use (e.g., the subwebs 102-106 can be attached to an email and utilized by a disparate user). Furthermore, the subwebs 102-106 can be customized by a plurality of users to meet specific needs.

The system 100 utilizes the subwebs 102-106 to focus a search over a collection of sites (e.g., the Internet) relating to one or more topics. As the sites within the subwebs 102-106 are relevant to a particular topic but not limited to one specific domain, a user can confidently search for topical information without fear of being flooded with irrelevant information. The system 100 includes a subweb selector 110 that selects one or more subwebs to utilize during a search. In accordance with one aspect of the present invention, the subweb selector 110 can be associated with a user interface (not shown) presented to the user on a display 112, wherein the user interface enables a user to select desirable subweb(s) to utilize in connection with searching for topical information. In accordance with another aspect of the present invention, the subweb selector 110 can automatically select one or more subweb(s) to employ in connection with an information search based upon a point of entry on the collection of sites or current site being reviewed (e.g., a web site). For instance, if the user is currently at a site relating to automobile purchasing, the subweb selector 110 can automatically select one or more subweb(s) with topics relating to automobiles. Furthermore, the subweb selector 110 can select appropriate subweb(s) based upon query terms entered into a general search engine and/or user history. For example, if a user has a history of reviewing computer-assistance pages and enters the term "virus" into a search engine, the subweb selector 110 can select a subweb relating to computers rather than selecting a subweb relating to biological illnesses.

The subweb selector 110 operates in connection with a searching component 114 that receives a search query. For example, the searching component 114 can be a general search engine, and the query can originate from a user, computer program, or the like. The subweb selector 110 can select one or more subwebs prior to the searching component 114 receiving the search query or after the searching component 114 receives the search query. For example, if a user manually selects one or more subwebs to utilize in connection with a search, the subwebs will be selected prior to receiving the search query. If the subweb selector 110 utilizes the search query to determine which subweb(s) to select, however, such selection will obviously not be completed until after the searching component 114 receives the search query.

Upon receiving the search query, the searching component 114 will perform a search for information according to such query, and the selected subweb will be utilized in connection with the search. Subweb 104 is illustrated as the selected subweb, but it is to be understood that the subweb selector can select any available subweb or combination of subwebs to assist in a search. In accordance with one aspect of the present invention, the search can be performed only over those sites contained in the selected subweb 106. This allows general search engines to utilize existing search algorithms while only returning sites found to be related to a topic represented by the subweb 106. Similarly, the searching component 114 can search the entire Internet (or other suitable collection of sites) for relevant information, and returned sites not existent in the subweb 104 can be deleted prior to returning the search results to the user. Results located by the searching component 114 and not deleted can be delivered to a user via the display 112.

In accordance with another aspect of the present invention, sites within the subweb 104 located by the searching component 114 can be given preference according to their assigned weight. More particularly, the searching component 114 can be a general search engine and locate/rank sites in a conventional manner based upon the search query. Sites located by the searching component 114 that are existent within the subweb 104 can thereafter be boosted according to their assigned relevance weight. Thus the conventional ranking system and/or methodology utilized by the searching component 114 can be integrated with the weighting of sites within the subweb 104. Therefore, for instance, a site within the subweb 104 that would have been listed fourth when employing conventional searching methodologies could be boosted to a position indicating more relevance to the search query. Thus, a function of a conventional ranking system and the weight assigned to sites is employed to rank search results. The ranked and located results can then be delivered to a user via the display 112. Furthermore, a combination of ranking and filtering can be employed in connection with providing a user with search results.

Figure 2:
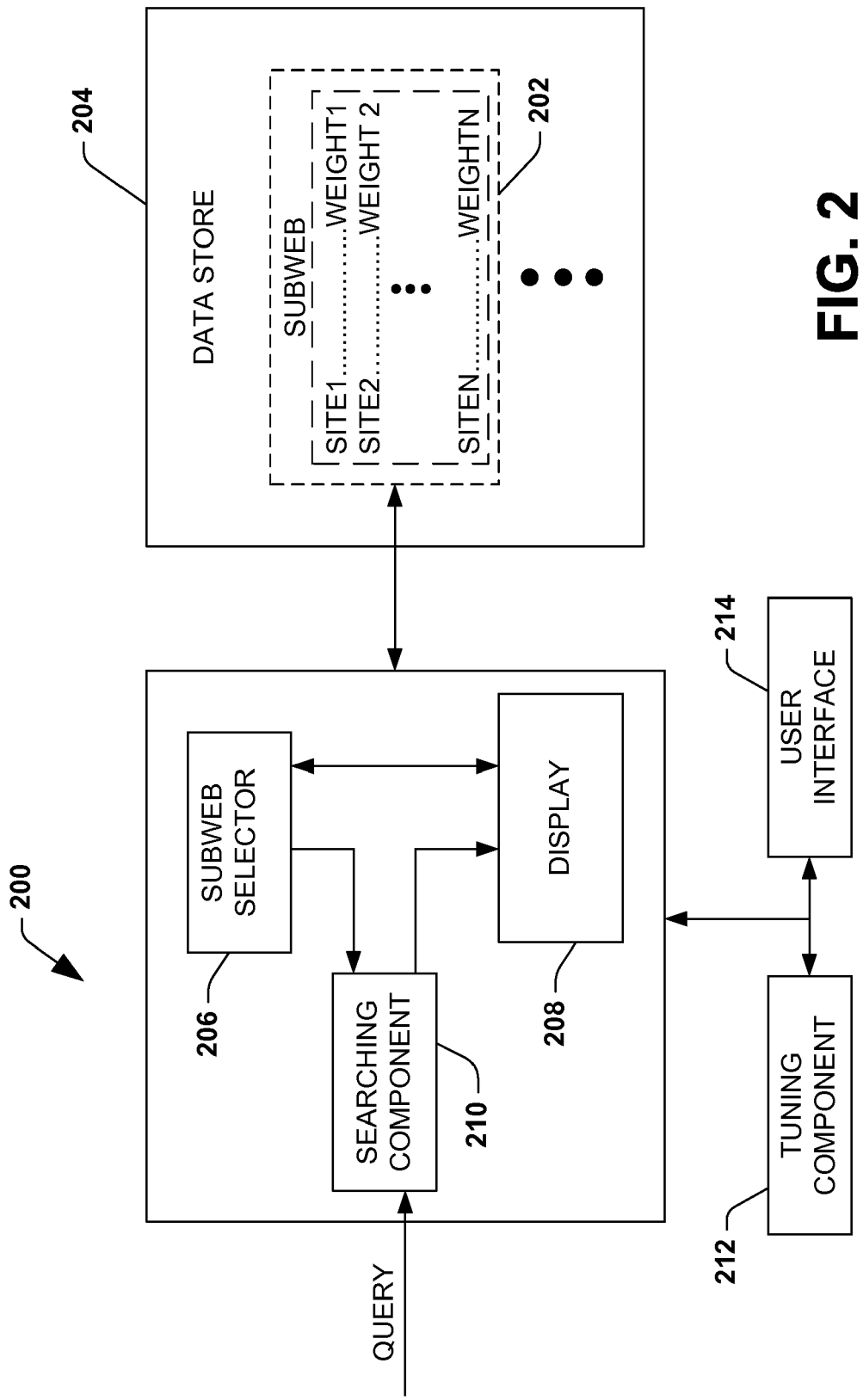
FIG. 2 is another block diagram of a system that facilitates improved searching in accordance with an aspect of the present invention.

Now referring to FIG. 2, a system 200 that facilitates focused searching over one or more topical areas of interest is illustrated. The system 200 also facilitates filtered searching according to a user's characteristics (e.g., sex, ethnicity, location, age, . . . ). The system 200 searches over a collection of sites via utilizing a subweb 202 that is within a data store 204 accessible to a user. The subweb 202 includes N sites, wherein N is an integer. The sites can be domains, paths, a cluster of sites, or other similar sites. Each of the N sites within the subweb 202 includes information relevant to the topic and/or user characteristic represented by the subweb 202, and each of the N sites is assigned a weight indicating its relevance to the topic and/or user characteristic. More particularly, site1 is assigned a weight of weight1, site2 is assigned a weight of weight 2, and site N is assigned a weight of weightN. Thus, reviewing weight1 with respect to weight2 will be informative regarding whether site1 is more relevant to the topic represented by the subweb 202 than site2.

The system 200 includes a subweb selector 206 that selects one or more subweb(s) to utilize in connection with a topically biased and/or filtered search. While the data store 204 is illustrated as only including the subweb 202, it is to be understood that any suitable number of subweb(s) can be generated and utilized when conducting a focused search. In this exemplary illustration the subweb selector 206 has selected the subweb 202. The subweb selector 206 can relay information to a display 208 regarding which subweb(s) have been selected. The system 200 further includes a searching component 210 that searches over at least the sites contained within the subweb 202 in response to a query. In accordance with one aspect of the present invention, the searching component 210 operates in a conventional manner and searches over an entire collection of sites (e.g., the entire Internet) with respect to search terms of the query. Thereafter returned sites not contained within the subweb 202 can be deleted, or returned sites can be ranked according to conventional ranking methods together with the weights assigned to the sites in the subweb 202. Thus, sites located by the searching component 210 and contained within the subweb 202 will receive a boost in ranking, while sites located by the searching component 210 and not contained within the subweb 202 will not receive a boost. Thus, ranking of sites can be a function of conventional search engine ranking methodologies together with the weights assigned to the sites within the subweb 202. Ranked results can then be relayed from the searching component 210 to the display 208.

The system 200 can be associated with a tuning component 212 that facilitates alteration/customization of the subweb 202 (e.g., before and/or after the subweb 202 has been selected by the subweb selector 206). For instance, the tuning component 212 can be utilized to add and/or remove particular sites from the subweb 202 via a user interface 214. This can be beneficial when names of domains and/or paths are changed, sites are added or removed from the Internet, content of sites are altered, etc. Thus, the tuning component 212 provides a mechanism that enables a user to manually alter contents of the subweb 202. In accordance with another aspect of the present invention, the tuning component 212 can be employed to automatically maintain the subweb 202. For example, the tuning component 212 can operate in conjunction with a crawler (not shown) to keep current the sites in the subweb 202. More particularly, the crawler can have access to a list of subwebs as well as sites contained within the subwebs. Upon determining that a site that once resided within a collection of sites (e.g., the Internet, an intranet, a server, client hard drive, . . . ) no longer exists, the crawler can search for the site within the subweb and delete such site if it is existent within one or more subweb(s). Similarly, the crawler can locate newly created sites and inform the tuning component 212 of such new sites. The tuning component 212 can thereafter determine if the site should be included in one or more subweb(s) based upon inlinks, outlinks, existence of search terms within the site, whether the site is part of a relevant domain, and other suitable indicia. Similarly, a crawler can determine that a site within the subweb 202 has been altered, and the tuning component 212 can review the alterations to ensure that the site is still relevant to a topic represented by the subweb 202 by searching for keywords, reviewing inlinks and/or outlinks, etc. The tuning component 212 can also use artificial intelligence/machine learning algorithms to maintain the subweb 202.

The tuning component 212 also facilitates customization of weights assigned to the sites within the subweb 202. For example, an algorithm that automatically assigns weights to each site can determine that site1 is more relevant to a topic represented by the subweb 202 than site2. Based on past experience and preference, however, a user can determine that site2 should be weighted in such a way that it is more relevant to the topic and/or user characteristic(s) represented by the subweb 202 than site1. Thus, the user can employ the user interface 214 to modify weighting of particular sites (e.g., slide bars, text entry boxes, . . . ). The user can thus customize a subweb according to preference and experience. The weights may be modified by artificial intelligence/machine learning algorithms as well.

Figure 3:
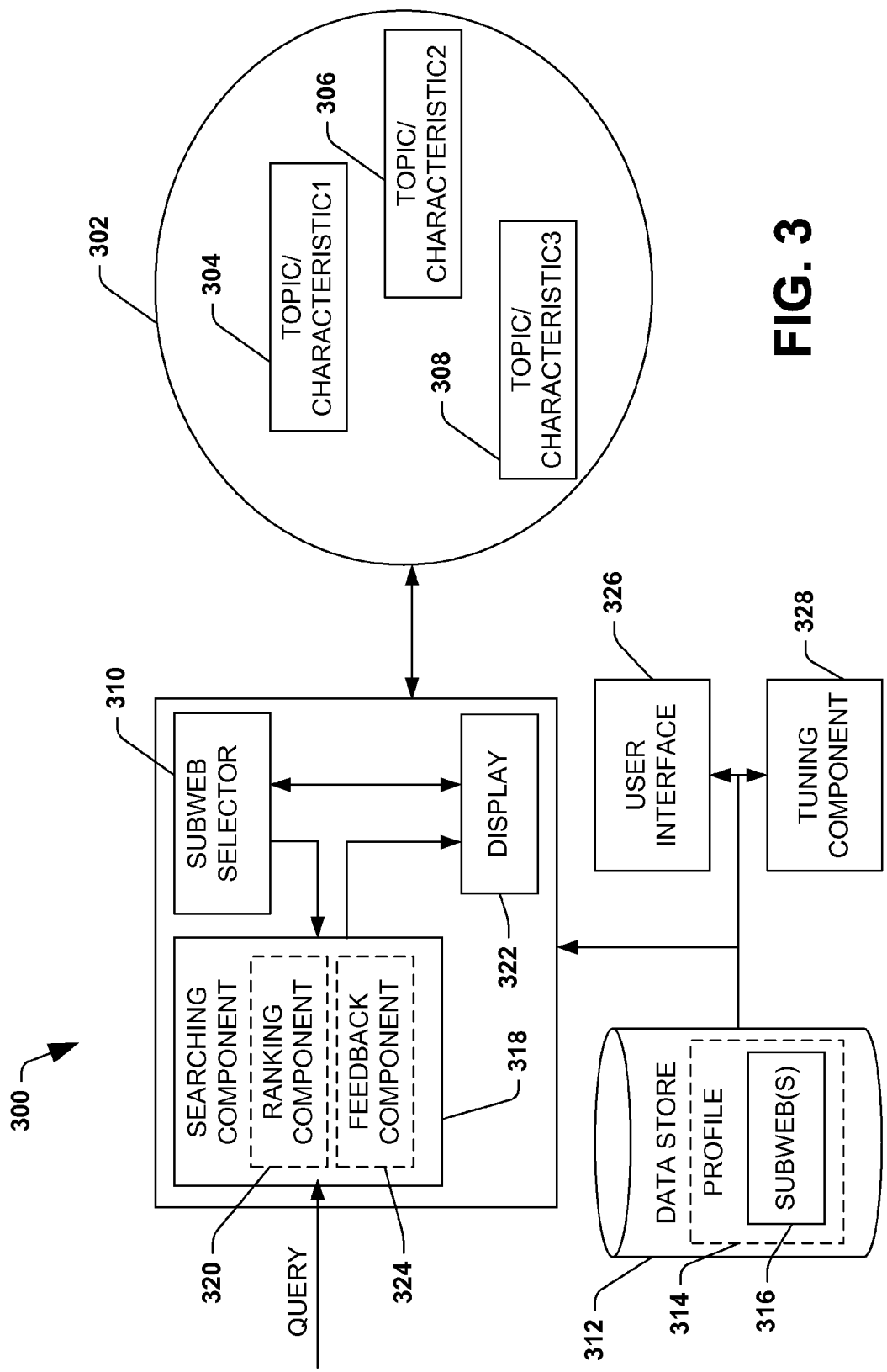
FIG. 3 is yet another block diagram of a system that facilitates improved searching in accordance with an aspect of the present invention.

Now turning to FIG. 3, a system 300 that provides for improved searching with respect to one or more particular topics and/or user characteristic(s) is illustrated. The system 300 is utilized in connection with searching a collection of sites 302 (e.g., the Internet, an intranet, data store of sites, . . . ) for information related to one or more particular topics and/or one or more user characteristics 304-308, wherein a subweb represents one particular topic and/or one or more user characteristics. A subweb includes a plurality of sites (e.g., domains, paths, clusters, . . . ) that are relevant to the topic and/or user characteristic(s) represented by the subweb, and the sites are weight biased according to their relevance. Thus a site that is highly relevant to the topic and/or user characteristic(s) represented by a subweb will receive a higher weight than a site that is less relevant to the topic and/or user characteristic(s) represented by the subweb.

A subweb selector 310 selects one or more subwebs to utilize in connection with searching the collection of sites 302 for information related to one or more particular topics and/or user characteristics 304-308 that is represented by one or more subwebs. In accordance with one aspect of the present invention, the subweb selector 310 can access a data store 312 that includes a user profile 314. The data store 312 can be a data storage device such as a hard drive, random access memory, read only memory, removable media, and CD-ROMs and the like. The user profile 314 in turn includes one or more subwebs 316 that can be employed in connection with searching the collection of sites 302 for topical information and/or information related to particular user characteristic(s). For instance, the data store 312 (and thus the subweb(s) 316) can be accessed via a network connection (e.g., the data store 312 can be an on-line data store accessible through a website). Thereafter the user profile 314 can be accessed, for example, by entering a user name and password on the website. Such an aspect enables a user to store the one or more subweb(s) 316 within the user profile 314, and access the subweb(s) 316 from any terminal that the user can employ to obtain a network connection. Thus, the subweb(s) 316 can include a subweb relating to one or more topics and/or user characteristic(s) 304-308, and such subweb(s) 316 can be utilized in connection with searching the collection of sites 302 for topical information as well as information relating to such user characteristics.

A searching component 318 searches the collection of sites 302 based upon a search query and a selected subweb. The searching component 318 includes a ranking component 320 that ranks sites located via the searching component 318. The ranking component 320 can utilize conventional search engine algorithms together with weights assigned to sites within the subweb(s) 316 to rank the located sites. For example, a site located by the searching component 318 that is contained by the subweb(s) 316 will contain a boost according to the corresponding weight of the site, while a site located by the searching component 318 that is not contained within the subweb(s) 318 will not receive a boost. Upon the searching component 318 locating sites and ranking the sites via the ranking component 320, the results can be delivered to a display 322.

The searching component 318 also includes a feedback component 324 that enables a user to improve future searches over the collection of sites. The feedback component 324 can provide surveys or accept comments from a user relating to a search, and the user can communicate with the feedback component via a user interface 326 that is associated with the system 300. For instance, the user can provide a query to the searching component 318 and utilize the subweb selector 310 to select one or more subweb(s) 316 to focus the search towards one of the topics/user characteristics 304-308. The searching component 318 can return sites that are located within the selected subweb(s) 316 as well as sites it finds relevant according to the user query that are not within the subweb(s) 316. The ranking component 320 can then rank the returned sites, providing boosts to returned sites within the selected subweb(s) 316 according to their weights. If a site is returned to the user that he feels is irrelevant to the topic represented by the subweb(s) 316, the user can utilize the feedback component 324 to omit such site from future searches that employ the selected subweb(s) 316. The user can also relay more particular feedback to the feedback component 324 via the user interface 326. For instance, the user can inform the feedback component 324 that he only desires to receive particular sites on specific days and/or at particular times when utilizing the selected subweb(s) 316 in connection with a search. In another example, a user can inform the feedback component 324 that he desirably receives inlinks and/or outlinks of particular sites whenever utilizing a specific subweb to effectuate a focused search. The feedback component 324 can also collect implicit user feedback. For example, the returned sites that the user visits can be used to boost respective weights in the subweb(s) 316. Thus, over time, the user can customize searches with respect to particular sites or topics according to preference.

A tuning component 328 can also be provided in connection with the user interface 326 to modify and customize one or more subweb(s) (e.g., one or more subwebs(s) 316). For instance, the tuning component 328 can be employed to add and/or remove particular sites within a subweb, and also to modify weights of sites within a subweb. A user can utilize the user interface 326 to manually add and/or delete sites, as well as to modify weights corresponding to disparate sites. In accordance with another aspect of the present invention, the tuning component 328 can be employed to automatically maintain subweb(s) by communicating with one or more crawlers (not shown). For instance, a crawler can inform the tuning component 328 that one or more sites within one or more subwebs has been altered or deleted. Similarly, the crawler can inform the tuning component 328 when one or more sites have been added to the collection of sites 302. More particularly, the crawler can be a web crawler that informs the tuning component 328 when one or more sites have been added to the Internet or an intranet.

Figure 4:
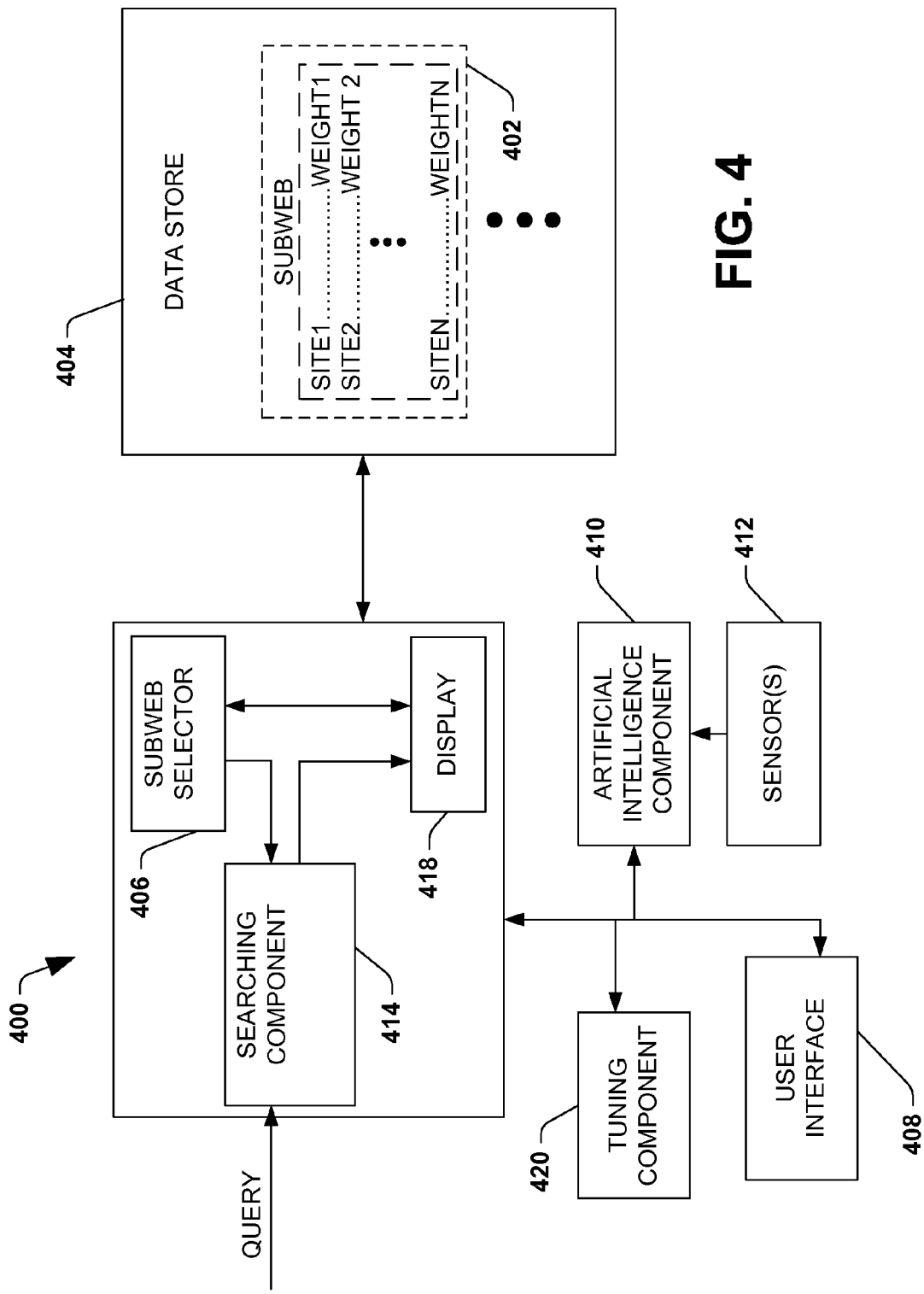
FIG. 4 is still yet another block diagram of a system that facilitates improved searching in accordance with an aspect of the present invention.

Now regarding FIG. 4, a system 400 that facilitates searching a collection of sites with respect to one or more particular topics and/or user characteristics is illustrated. The system 400 is employed to search a collection of sites (e.g. the Internet, an intranet, . . . ) for information relating to one or more topics and/or user characteristic(s), wherein the one or more topics/user characteristic(s) are represented by one or more subweb(s) 402 that are stored within a data store 404. The subweb(s) 402 include a plurality of sites that can be found within a collection of sites that are relevant to a topic/user characteristic that the subweb(s) 402 represent. Each site within the subweb(s) 402 is weighted according to their relevance to the topic/user characteristic represented by the subweb(s). For instance, more relevant sites are given a higher weighting.

The system 400 includes a subweb selector 406 that facilitates selection of one or more subweb(s) that are desirably utilized to focus a search. The subweb selector 406 can be associated with a user interface 408 that enables a user to manually select particular subweb(s) to utilize in connection with a focused search. In accordance with another aspect of the present invention, the subweb selector 406 can determine a subweb to select based at least in part upon point of entry within the a collection of sites (e.g., the Internet). Furthermore, the subweb selector 406 can be associated with an artificial intelligence component 410 that can infer which subweb(s) to select based at least partially upon the query, user history, user state, and/or user context.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Thus, for instance, the artificial intelligence component 410 can watch a user and "learn" over time user desires given a particular user state and context. For instance, a user might typically use a particular subset of subwebs in connection with an Internet search during particular times of the day and/or when the user is at particular locations. The artificial intelligence component 410 can receive data from various sensor(s) 412 (e.g., time of day, user location, . . . ) and utilize such data to perform an appropriate inference. Moreover, the artificial intelligence component can employ a cost/benefit analysis with respect to informing the subweb selector 406 to select a particular subweb. More particularly, the artificial intelligence component can balance a benefit of informing the subweb selector 406 to select one or more correct subwebs against a cost of informing the subweb selector 406 to select one or more incorrect subwebs or omit desirable subwebs.

A searching component 414 receives a search query and, in connection with one or more selected subwebs, locates and ranks sites resulting from the search query. The searching component 414 can employ conventional search engine ranking systems and/or methodologies together with the weights assigned to sites within one or more selected subwebs to rank the search results. Such results can then be relayed to a user via a display 418. The searching component 414 can also be in communication with the artificial intelligence component 410 to provide a more accurate search. For example, user preference according to particular sites within subsets can change as user context changes. For example, a user searching for weather information may prefer a first site related to weather on the Internet when in a first geographic location and prefer a second site related to weather on the Internet when in a second geographic location. The artificial intelligence component can watch the user and learn which sites within one or more subwebs the user prefers as user context alters. The sensor(s) 412 can be employed to notify the artificial intelligence component 410 of changes in user context.

The system 400 further includes a tuning component 420 that can be employed to modify one or more subweb(s) (e.g. subweb 404). For instance, a user can access the subweb 402 via the user interface 408 and make alterations to sites within the subweb (e.g., add sites, delete sites, alter weights). Furthermore, the tuning component 420 can operate in connection with the artificial intelligence component 410 to automatically tune the subweb 402. For example, the subweb 402 can initially include a site with a corresponding weight indicating that the site is highly relevant to a topic represented by the subweb 402. When utilizing the subweb 402 to effectuate a search, however, the user rarely selects the site even though it is ranked highly. The artificial intelligence component 410 can watch user activity over time with respect to user state and context and learn which sites the user prefers. Thereafter the artificial intelligence component 410 can inform the tuning component 420 that particular sites in specific subwebs should be tuned. The artificial intelligence component 410 can determine a probability of making a correct alteration to the subweb 402, and measure a cost of incorrect alteration of the subweb 402 with a benefit of correct alteration given such probability.

Figure 5:
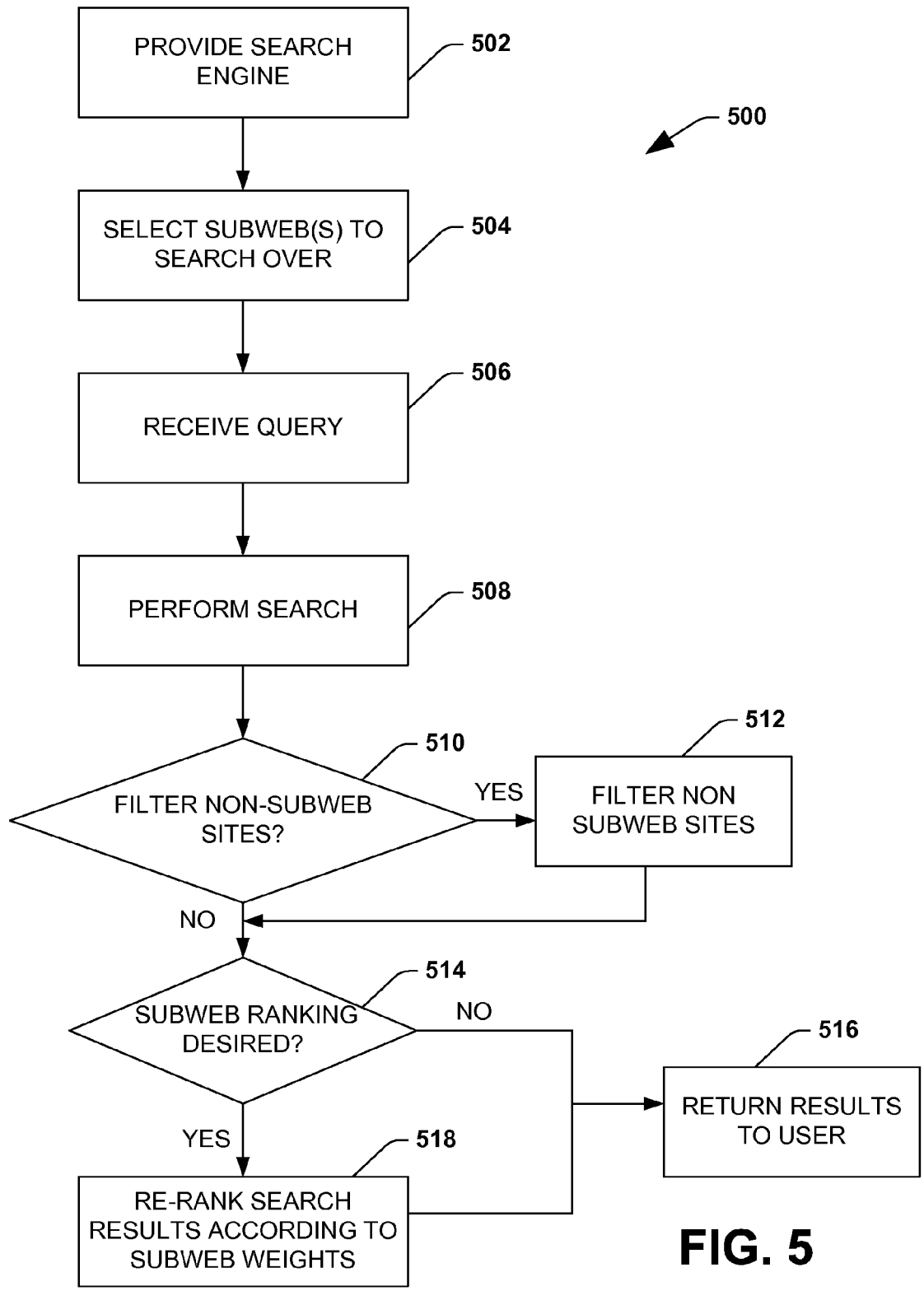
FIG. 5 is a flow diagram of a method for utilizing subwebs in connection with improving relevance of search results in accordance with an aspect of the present invention.

Referring now to FIG. 5, a methodology 500 for performing a topical search by utilizing one or more subwebs is illustrated. While, for purposes of simplicity of explanation, the methodology 500 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 502, a search engine is provided that can search for information over a substantial portion of a collection of documents (e.g., the Internet, an intranet, collection of sites on a local hard drive, . . . ). The search engine can include conventional systems and/or methodologies for locating and ranking search results based upon a search query. At 504, one or more subweb(s) that represents a topic of interest to a user is selected. In accordance with one aspect of the present invention, a user interface can be provided to enable a user to manually select one or more desirable subweb(s). Furthermore, one or more subweb(s) can be selected based upon the current query, recent queries, point of entry, and other indicia that can be informative of a topic that a user desires to search over. In accordance with another aspect of the present invention, use state and context can be monitored, and one or more subweb(s) can be selected based at least in part upon such user state and context.

At 506 the search engine receives a user query. The query can be in a Boolean form as is conventional when employing search engines, or in any other suitable form that enables a search engine to effectuate a search over a collection of sites, wherein the search is based at least in part upon the query. At 508 a search is performed based upon the query. In accordance with one aspect of the present invention, the user can decide whether to perform the search only over sites within the selected subweb(s) prior to performing the search. Depending upon implementation, this may enable an extremely fast search, as only a small number of sites would be searched. Alternatively, the user can allow the search engine to perform a conventional search over a substantial portion of a collection of sites (e.g., the entire Internet).

At 510, a determination is made regarding whether all or a portion of the sites that are not within the selected subweb(s) are desirably filtered. If all or a portion of the sites that are not within the selected subweb(s) are desirably filtered, such sites are filtered at 512. Whether or not filtering is desired, a determination is made regarding whether the results should be re-ranked according to weights assigned to sites within the subweb(s) at 514. If the user desires to simply utilize conventional search engine ranking techniques, then at 516 results of the search are returned to the user. If, however, it is desirable to consider weights assigned to sites within the subweb(s) together with the ranking of sites resulting from the conventional search, at 518 the search results are re-ranked according to site weights. For instance, a site returned during the search that was weighted as highly relevant in the subweb(s) will receive a boost, and possibly be moved to a position in the search results that indicates more relevance (e.g., from fourth to first). Sites returned by the search engine that are not located within the subweb(s) will not receive a boost. After the search results have been re-ranked according to weights assigned to sites within the subweb(s), the results of the search indicating the re-ranking will be provided to the user at 516.

Figure 6:
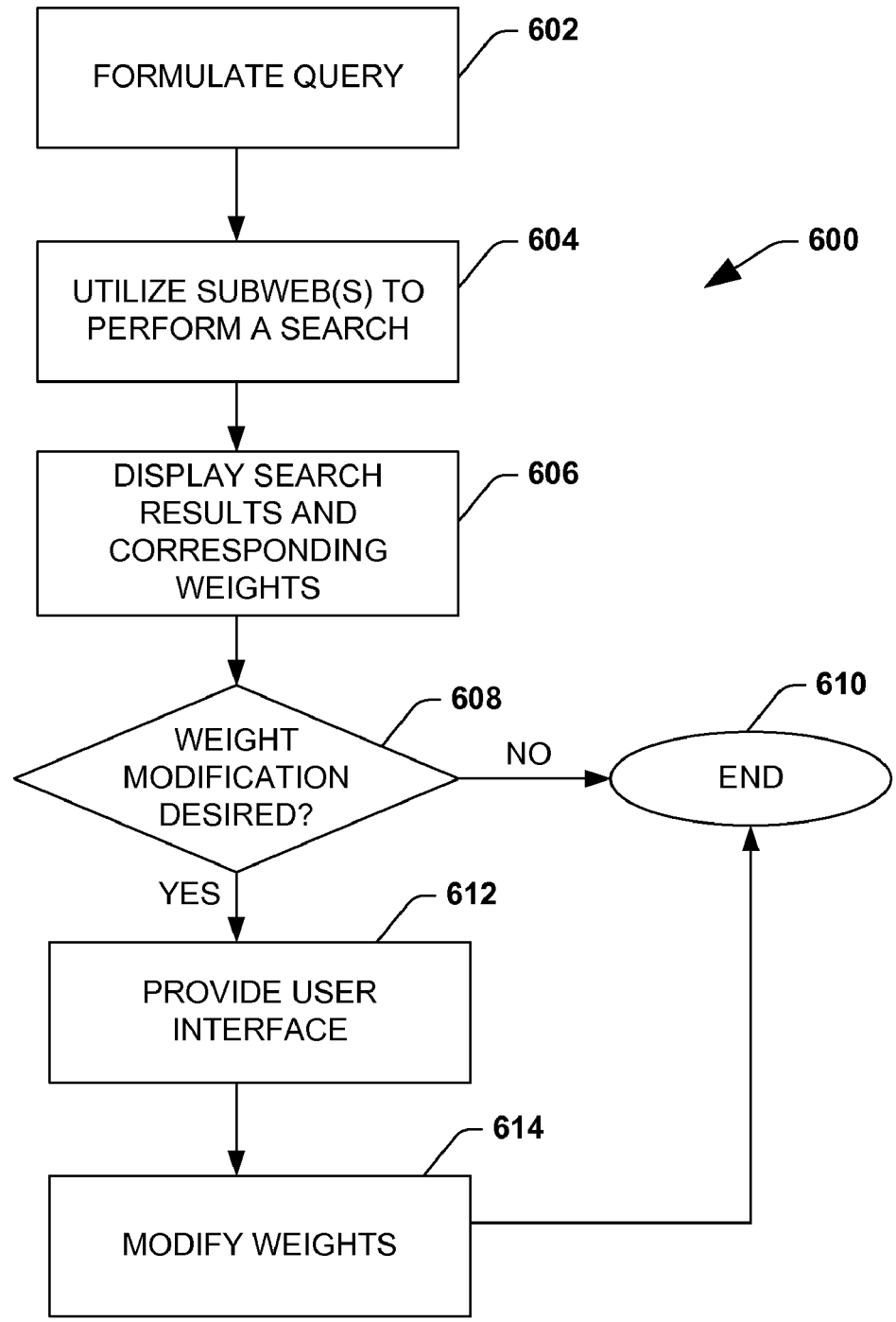
FIG. 6 is a flow diagram of a method for modifying a subweb in accordance with an aspect of the present invention.

Now referring to FIG. 6, a methodology 600 that facilitates modification of one or more subweb(s) is illustrated. At 602 a search query is formulated and provided to a search engine. At 604, one or more subweb(s) are employed to perform a focused search over a collection of sites. For instance, if a user is desirably searching for information relating to a topic of automobiles, one or more subweb(s) containing sites relating to automobiles can be employed to focus the search. For instance, the subweb(s) can be general with respect to automobiles and/or be specific and relate to particular manufacturers of automobiles, automobile sales, particular styles of automobiles, etc.

At 606, results of a search and corresponding weights of sites that are contained within the subweb(s) are displayed to the user. Thus, the user can review the weights and determine appropriateness of such weights given previous experiences and present preferences. At 608 a determination is made regarding whether the user desires to modify one or more weights assigned to sites within the subweb(s). If the user has no such desire, then the methodology 600 ends at 610. If alterations of weights are desired, however, a user interface is provided to the user at 612 to effectuate such modifications. For example, slide tools, data tables with position for data entry, etc. can be presented to the user to facilitate weight modification. At 614, the user makes the desired modifications to the weights of the sites, thereby customizing future searches according to his preference with respect to modified sites. The methodology thereafter ends at 610.

Figure 7:
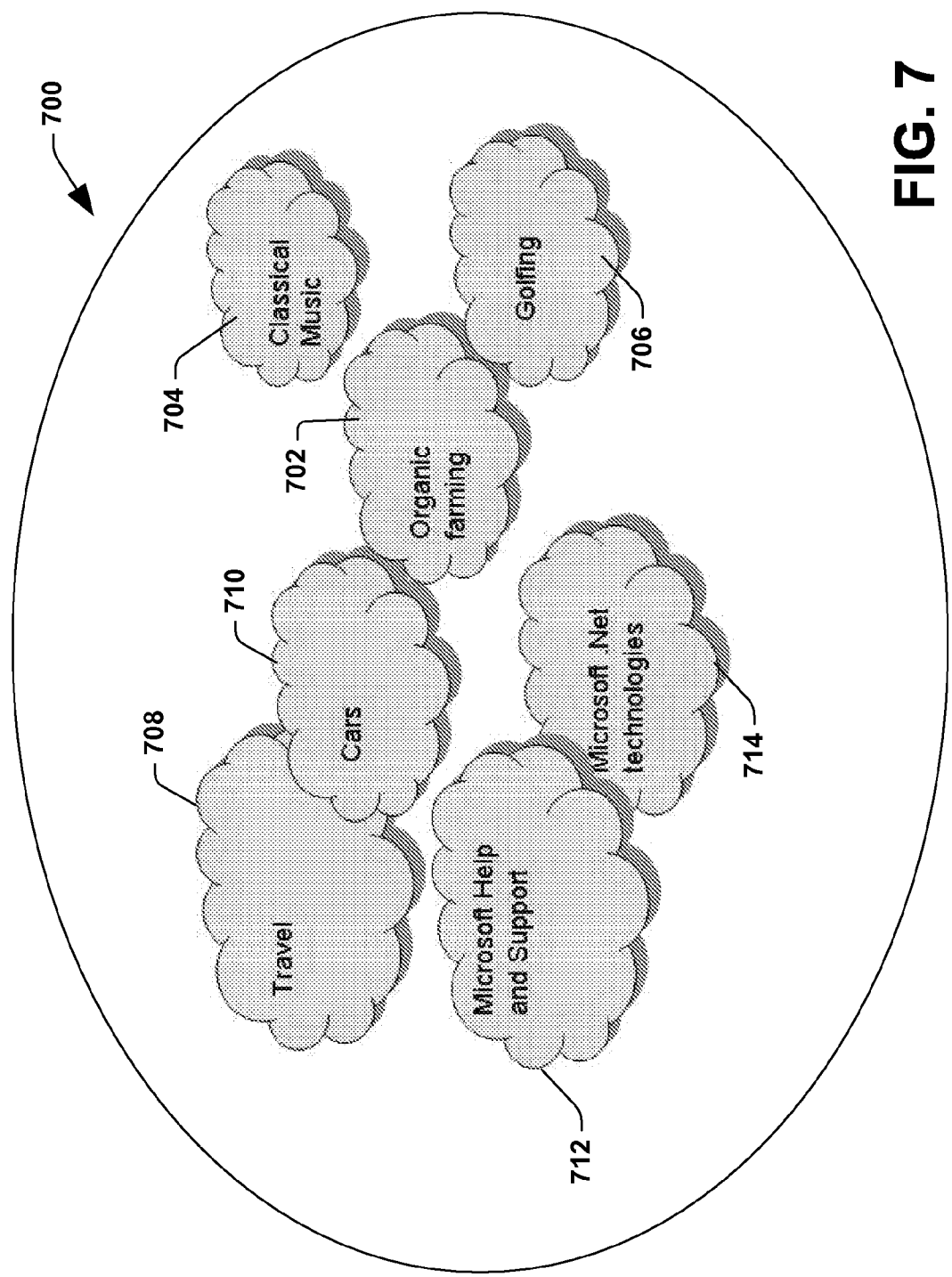
FIG. 7 is an exemplary partitioning of the Internet into a plurality of topics in accordance with an aspect of the present invention.

Turning briefly to FIG. 7, an exemplary division of the Internet 700 into a plurality of disparate topics is illustrated. While a collection of sites is illustrated with respect to FIG. 7 as the Internet, it is understood that any suitable collection of sites can be divided in a substantially similar manner. The Internet 700 can be seen as a collection of information that can fall into a variety of disparate topics. Thus, the Internet itself can be viewed as a plurality of topics. These topics can vary in scope, and two disparate topics can contain same sites and/or information. For example, a topic of "sports" can be within the Internet as well as a topic of "golf" Information relating to golf will obviously be related to sports in general. Thus, subwebs relating to topics of golf and sports, respectively, will contain overlapping sites. Furthermore, a subweb relating to sports can wholly contain a subweb relating to golf. An intranet (not shown) can be similarly divided into a plurality of topics.

In this exemplary division of the Internet 700, several topics have been identified. For example, an organic farming topic 702, a classical music topic 704, a golfing topic 706, a travel topic 708, a cars topic 710, a Microsoft® help and support topic 712, and Microsoft.Net technologies topic 714 have been identified. Further, it can be seen that the topics of automobiles 710 and the topic of travel 708 at least partially overlap, as do the topics of Microsoft® help and support 712, and Microsoft.Net technologies 714. Subwebs can be created that represent each of these topics as well as other topics existent within the Internet 700 that can be defined.

Figure 8:
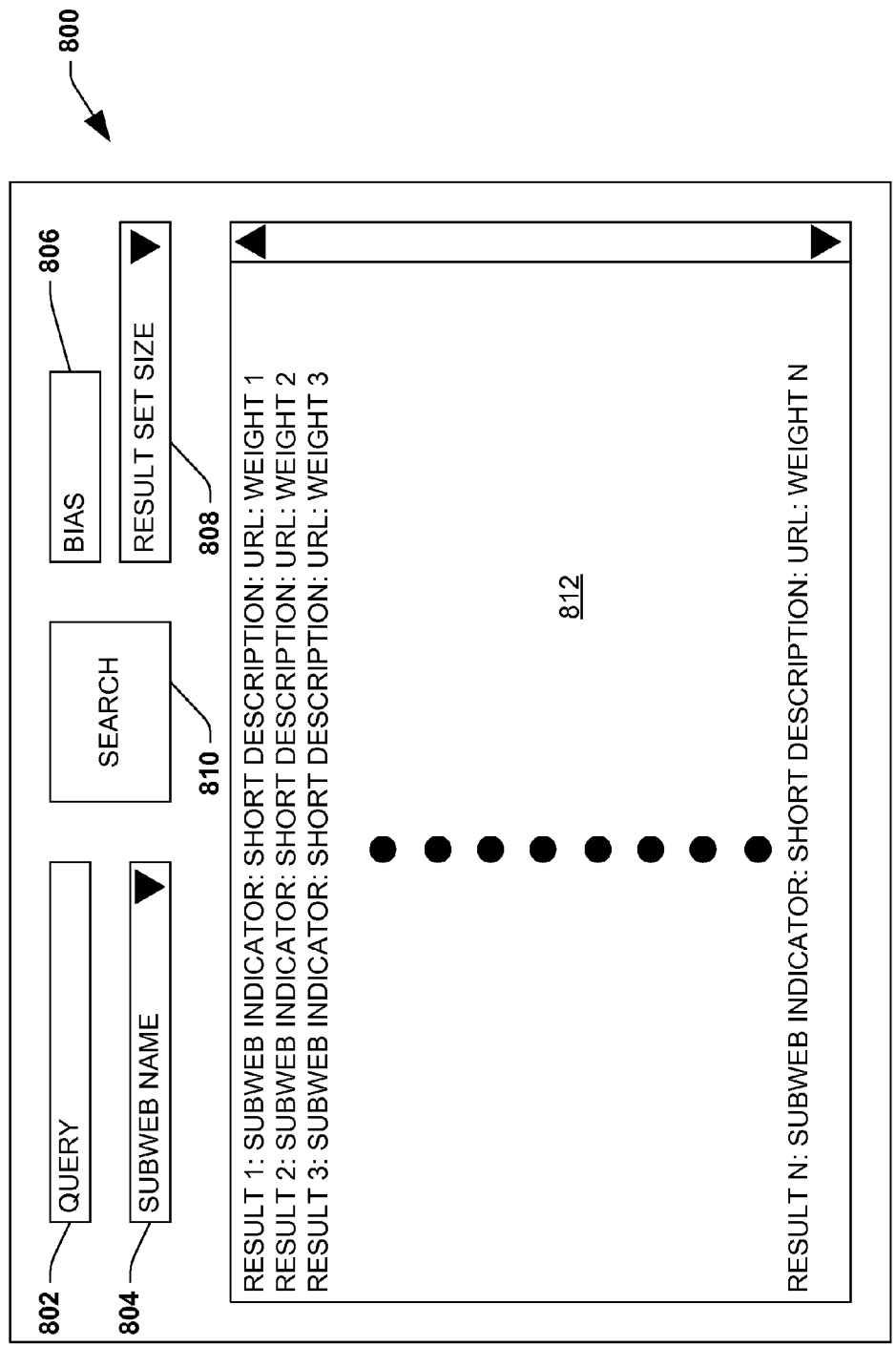
FIG. 8 is an exemplary search display that can be employed in connection with the present invention

Turning now to FIG. 8, an exemplary user interface 800 that enables a focused search with respect to a particular topic and/or user characteristic(s) through utilization of one or more subweb(s) is illustrated. The interface 800 includes a query entry position 802 where a user can enter a desirable search query. A subweb selector position 804 enables the user to select one or more subweb(s) that will be utilized to focus a search around a topic/user characteristic represented by the subweb(s). While the subweb selector position 804 and other data entry mechanisms are represented as pull-down menus, it is to be understood that any suitable mechanism that allows selection of one or more entities is contemplated by the present invention and intended to fall within the scope of the hereto-appended claims. For instance, the subweb selector position 804 can be a series of links, wherein selection of each link results in selection of a corresponding subweb to utilize in connection with a search. Similarly, the subweb selector position 804 can be a list of available subweb(s) with a selectable box associated with each of the subweb(s). Thus, by selecting the box the user is selecting a subweb to utilize in connection with focusing a search. These methods of selecting a particular entity are exemplary only, and not meant to be limit the scope of the present invention.

A bias position 806 enables a user to determine whether a search engine should rank search results according to conventional search systems and/or methodologies, or alternatively account for weights associated with sites contained within the selected subweb(s). Furthermore, the bias position 806 allows for a user to delete at least one returned site that does not exist within the selected subweb(s) (e.g. the user can select a level of filtering with respect to returned sites not resident within the selected subweb(s)). A result set size selector 808 can be utilized to determine a number of results that will be returned to the user.

Upon entering a query into the query entry position 802 and selecting other desirable search parameters via the subweb selector position 804, bias position 806, and result size selector 808, the user can select a search button 810 to effectuate the search based upon the entered parameters. A display position 812 illustrates results returned from the search. In this exemplary figure, N results are displayed, where N is an integer. Each result can comprise information that informs the user of relevance of the result. For example, the results can include a page title and short description of the contents of the page, as is conventional when performing searches. The results can also include a subweb indicator that informs the user whether the result is a site that is located within the selected subweb(s). For instance, the results can be displayed in a first color if they are sites within the selected subweb(s) and in a second color if results are sites are not resident within selected subweb(s). Other systems and/or methods of indicating whether results are sites within the selected subweb(s) are contemplated and intended to fall within the scope of the hereto-appended claims. The results on the display 812 can also include a URL of that page to inform the user of the domain and/or path that the results reside. Furthermore, a weight can be displayed which indicates relevance of a site with respect to a topic represented by the selected subweb(s). While not shown, a change in ranking due to weights of sites within the selected subweb(s) can be displayed to a user. For example, a conventional search engine would return result 3 (which represents a first site) as the best result if not for the weight assigned to a site represented by result 1. Thus, a change in rank due to weighting of sites within the selected subweb(s) can be displayed to the user.

Figure 9:
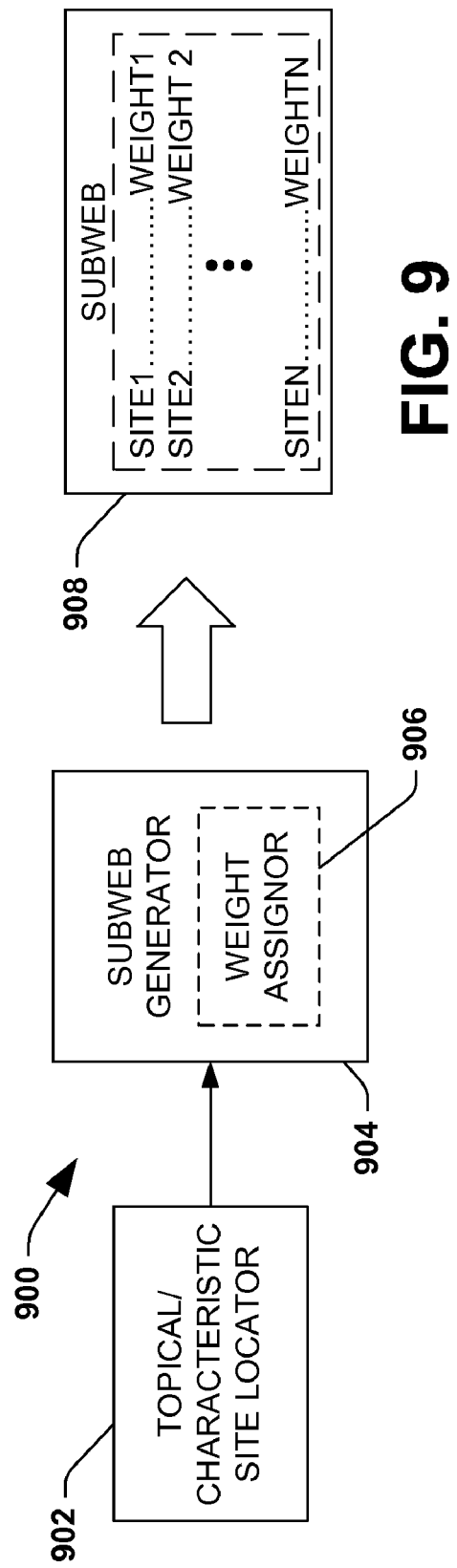
FIG. 9 is a block diagram of a system that facilitates creation of a subweb in accordance with an aspect of the present invention.

Now referring to FIG. 9, a system 900 that facilitates generation of a topic-specific and/or characteristic specific subweb is illustrated. It is to be understood that the system 900 is easily utilized by computer users who are not particularly computer-savvy, thereby not limiting benefits of the subject invention to computer scientists, computer programmers, and the like. The system 900 includes a topical/characteristic site locator 902 that locates sites on the Internet germane to a particular topic and/or user characteristic. For example, a general search engine can be employed in connection with the topical/characteristic site locator 902 to locate sites over a collection of sites (e.g., the Internet, an intranet, . . . ) related to a topic that is of-interest to a user. Alternatively, a user can use the topical/characteristic site locator 902 and simply compile known sites that the user feels is relevant to the of-interest topic. For example, the user could enter the path www.golfaddict.com if the user feels that such domain is relevant to an of-interest topic of golf. Furthermore, sites related to users comprising particular characteristics can be retrieved by the topical/characteristic site locator 902. In accordance with one aspect of the present invention, the topical/characteristic site locator 902 receives a plurality of search terms related to a particular topic and/or user characteristic and performs a general search utilizing each of those terms. Sites that are returned multiple times utilizing the disparate search terms are presumably (but not necessarily) relevant with respect to the topic and/or user characteristic.

The topical/characteristic site locator 902 relays the located sites to a subweb generator 904 that includes a weight assignor 906. The weight assignor 906 assigns weights to each site located by the topical/characteristic site locator 902 according to a calculated relevance to an of-interest topic and/or user characteristic. In accordance with one aspect of the present invention, the topical/characteristic site locator 902 utilizes multiple searches relating to a particular topic/user characteristic on a general search engine. For example, a collection of search terms relating to a topic and/or user characteristic(s) are input to the search engine, and returned results are relayed to the weight assignor 906. More particularly, a user interested in a topic of golf could enter such search terms as "fairway," "green," "iron," "wood," "hazard", etc. When searched individually, results from these search terms will include substantial amounts of data not relevant to the topic of golf. A subset of the collective results, however, will be common between two or more search terms. Relevance of a site with respect to a topic presumably increases as a number of instances that a site is returned with respect to disparate topical queries increases. Thus, the weight assignor 906 assigns relevance weights to sites based at least in part upon a number of instances that a site is returned from general searches when the searches are performed via utilizing disparate topical/user characteristic search queries. The subweb generator 904 can also filter sites that are not assigned a threshold weight.

In accordance with another aspect of the present invention, the weight assignor 906 can assign relevance weights to sites according to prior user history. For instance, if a user frequently visits one particular website and that site is located by the topical/characteristic site locator 902, then that site may be of particular relevance to the user (and to the of-interest topic and/or user characteristic). Upon assigning weights to the sites located by the topical/characteristic site locator 902 and, if desired, filtering sites with low assigned weights, the subweb generator 904 creates an identifiable subweb 908. The subweb 908 includes a plurality of sites that are relevant to a topic and/or user characteristic(s) that the subweb represents, and biased relevance weights that indicate a degree of relevancy to the topic/user characteristic(s). Thereafter the subweb 908 can be saved, duplicated, transferred to a disparate user, etc. and employed in connection with effectuating a focused search as described supra.

Figure 10:
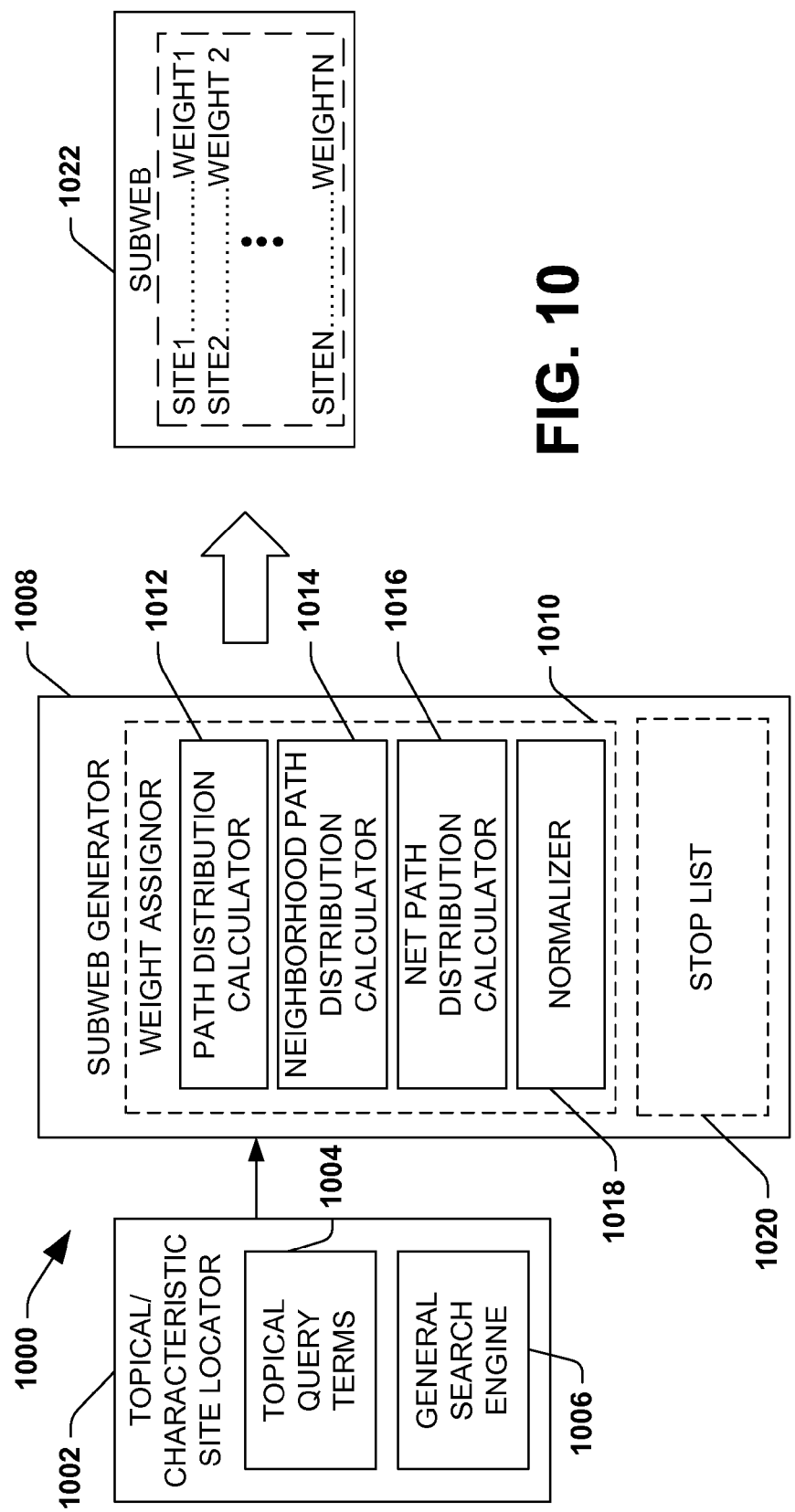
FIG. 10 is another block diagram of a system that facilitates creation of a subweb in accordance with an aspect of the present invention.

Turning now to FIG. 10, a system that facilitates creation of a subweb that represents a particular topic is illustrated. The system 1000 includes a topical/characteristic site locator 1002 that locates a plurality of sites that are relevant to a particular topic and/or user characteristic(s) of interest. The topical/characteristic site locator 1002 includes a plurality of topical query terms 1004 that will be input as search queries into a general search engine 1006. In accordance with one aspect of the present invention, the topical query terms 1004 can be a query log of a topic-specific site. For instance, www.golfaddict.com can be a site related particularly to the topic of golf, and a log of search queries on that site can be presumably related to golf. Search queries existent in the query log of the topical site can be utilized as search queries into a general search engine, wherein results from a plurality of domains will be returned. Results obtained from this plurality of searches can be obtained and relayed to a subweb generator 1008 that utilizes the results to create a subweb that is representative of a topic of interest. In accordance with another aspect of the present invention, the topical query terms 1004 can be obtained by extracting keywords from a topic-specific site. Furthermore, a user can simply generate a list of search terms that they feel is relevant to the of-interest topic, and utilize that list as the topical query terms. In accordance with another aspect of the present invention, a set of seed URLs and/or paths of significance can be employed, and keywords can be extracted from these web sites. Furthermore, similar actions can be taken in connection with obtaining sites related to particular user characteristics (e.g., age, ethnicity, sex, political affiliation, . . . ).

The subweb generator 1008 receives the results (sites) of the searches and includes a weight assignor 1010 that assigns biased relevance weights to the located sites. The weight assignor 1010 is associated with a path distribution calculator 1012 that calculates distribution paths in the results. More particularly, the path distribution calculator 1012 determines which sites were returned as results of disparate queries, and tabulates a number of instances that the sites were returned as results. The path distribution calculator 1012 can further account for a ranking assigned to a returned site by a general search engine as well as inlinks and outlinks related to that site when calculating distribution paths. More particularly, sites highly ranked by a general search engine can be additionally weighted when calculating distribution paths, and inlinks and outlinks associated with those sites can also be additionally weighted when determining distribution of sites that neighbor the returned sites. A neighborhood path distribution calculator 1014 computes a distribution of sites that neighbor sites returned as results of the searches. For example, the neighborhood path distribution calculator 1014 can determine a distribution of URLs that point to site(s) returned in the search (e.g., inlinks) and URLs that link from site(s) returned in the search (e.g., outlinks). A threshold number of inlinks and outlinks to consider can be provided to ensure feasibility of calculating the neighborhood path distribution.

The weight assignor 1010 further includes a net path distribution calculator 1016 that determines a net path distribution by combining results obtained via the path distribution calculator 1012 and the neighborhood path distribution calculator 1014. Net path distribution is determined by adding a probability distribution of path neighborhood to the path distribution as calculated by the path distribution calculator 1016. Differential weighting can be employed to provide for an optimal net path distribution. A normalizer 1018 is employed to normalize the net path distribution. The normalizer 1018 is utilized to reduce relevance of sites that have a substantial number of links and may not be related to the of-interest topic. In accordance with one aspect of the present invention, the general search engine 1006 utilizes a plurality of random search terms to obtain a set of results. Thereafter the path distribution calculator 1012 calculates the distribution of paths in the search results. The neighborhood path distribution calculator 1014 then computes the neighborhood path distribution and the probability distribution of path neighborhood. The net path distribution calculator 1016 then calculates the net path distribution as described above. The normalizer 1018 then computes the probability distribution relating to the topic-specific/user characteristic search terms and subtracts similar numbers from the probability distribution relating to the random search terms. The normalizer is necessary because a plurality of sites have a substantial number of inlinks and outlinks, and may not be relevant to any one particular topic and/or user characteristic.

Based upon these calculations a biased weighting is assigned to each site via the weight assignor 1010. If desirable, returned sites that do not have a threshold weight can be discarded. Similarly, a threshold number N of sites within a subweb can be defined, and sites with the most relevant N weights can be utilized in a subweb. Furthermore, the subweb generator 1008 can include a stop list 1020 that includes a list of sites determined to be not relevant to a topic and/or user characteristic of interest. For example, sites that are known to be irrelevant a priori to the topic and/or user characteristic of interest will automatically be discluded from a subweb to be generated via the subweb generator 1008. Upon assigning weights to each site not filtered, the subweb generator 1008 generates a subweb 1022 particular to an of-interest topic and/or user characteristic(s). Thereafter the subweb 1022 can be saved, duplicated, transferred to a disparate user, etc. and employed in connection with effectuating a filtered search with respect to a topic and/or user characteristic as described supra. In accordance with another aspect of the present invention, the subweb 1022 can be generated to be a portion of a subweb hierarchy. Thus, a continuously more specific hierarchy of subwebs can be generated.

Figure 11:
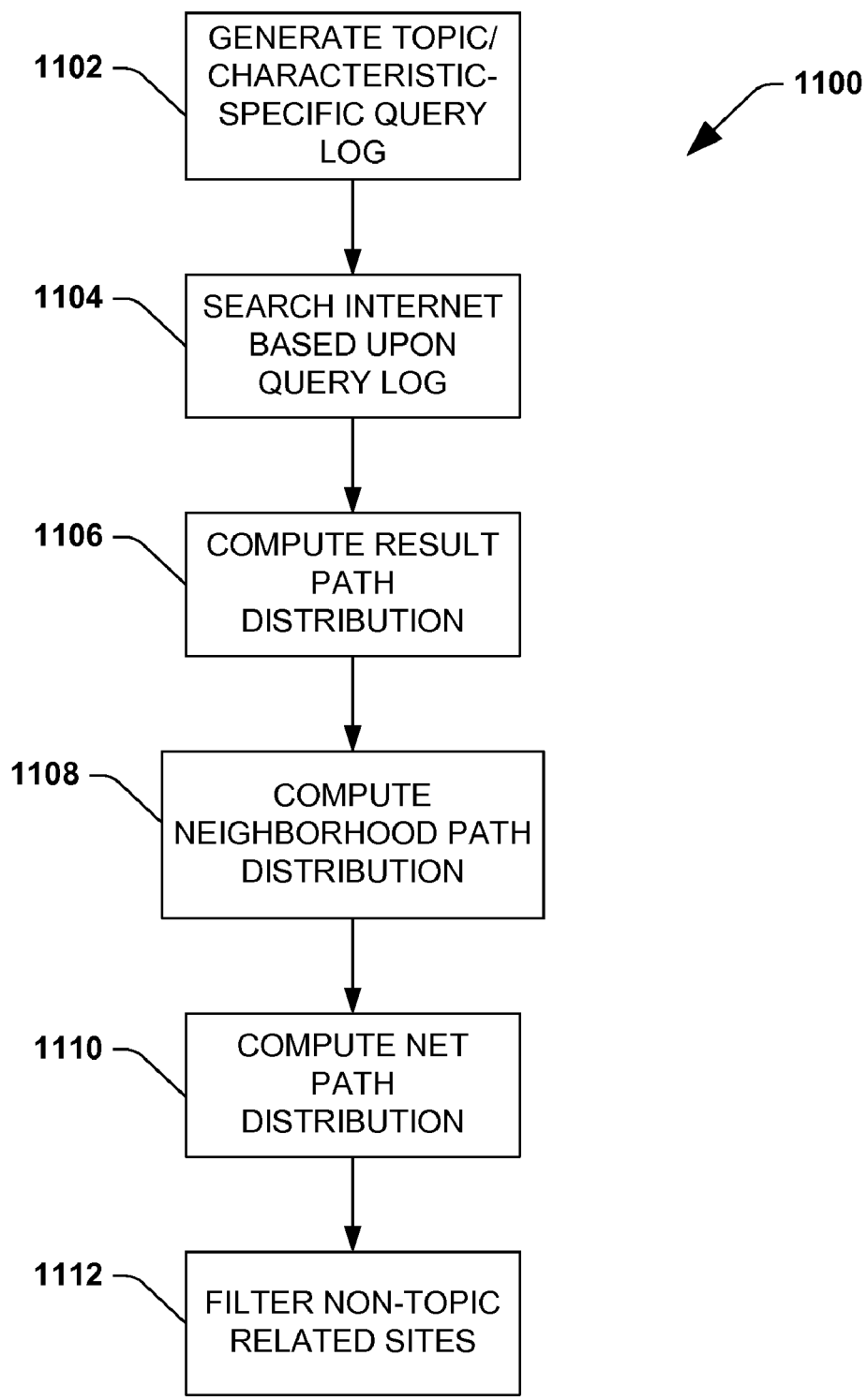
FIG. 11 is a flow diagram of a method for creating a subweb in accordance with an aspect of the present invention.

Now referring to FIG. 11, a methodology 1100 that facilitates generation of a subweb related to a particular topic and/or user characteristic is illustrated. At 1102, a topic-specific/user characteristic(s) particular query log is generated. This can be created via obtaining a query log from a topic-specific web site, extracting keywords from a topic-specific text site, providing a seed URL and extracting keywords from that seed and associated inlinks/outlinks, etc. Furthermore, a user can generate a topic-specific and/or user characteristic specific query log via creating a list of search terms that, based on experience and preference, the user feels is specific to a topic of interest.

At 1104, a general search engine performs multiple searches over a collection of sites (e.g., the Internet, an intranet, . . . ) utilizing the query terms existent within the query logs. The result sets of these searches are stored for further computation and analysis. At 1106, a distribution of paths existent within the search results is computed. As multiple searches are performed utilizing differing topical/characteristic search queries, it is inevitable that at least a portion of the result sets will be irrelevant to the of-interest topic and/or user characteristic. However, if an identical site is returned multiple times utilizing different topic-specific search queries, such site is presumably relevant to the of-interest topic and/or user characteristic.

At 1108, a path distribution of sites neighboring the sites in the result set is computed, as sites neighboring returned sites might be relevant to the of-interest topic/user characteristic.

For instance, sites that are linked into sites in the return set and sites that are linked from sites in the return set can be considered and are utilized to calculate a path distribution of neighboring sites. At 1110, a net path distribution is determined by summing a probability distribution of path neighborhood to the distribution of paths existent within the search results, with some differential weighting to ensure creation of an optimal subweb. At 1112, sites within the return set that are not relevant to the topic are filtered and not included in the subweb. For example, a plurality of sites can be discarded because they contain a substantial number of inlinks and outlinks, and are thus not relevant to the topic/user characteristic of-interest (e.g., they are large, general sites to/from which many people link). Furthermore, sites with low weight in the net path distribution calculation can be omitted from the subweb, as they are not particular enough to a topic and/or user characteristic that the subweb will represent.

Figure 12:
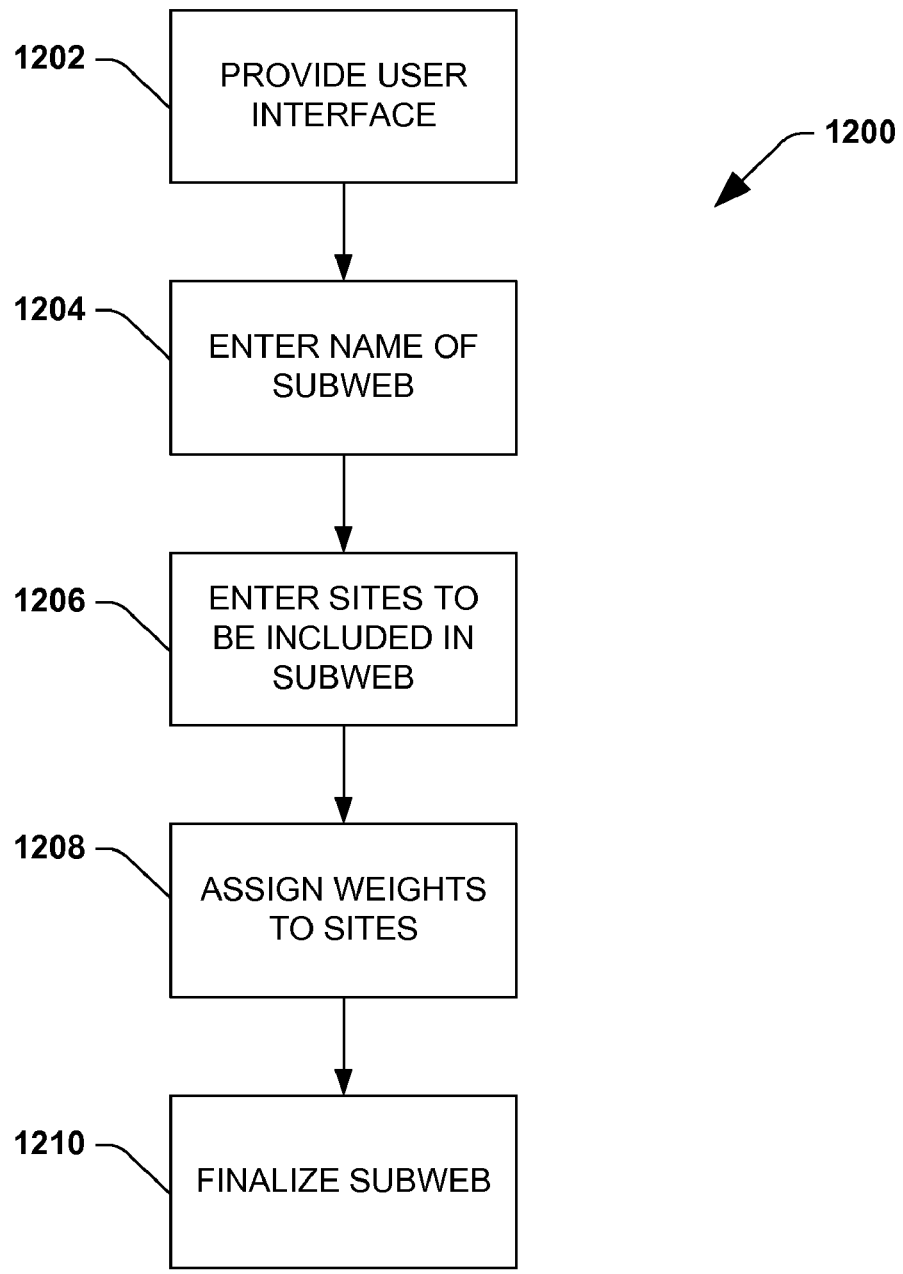
FIG. 12 is another flow diagram of a method for creating a subweb in accordance with an aspect of the present invention.

Now turning to FIG. 12, a methodology 1200 for manually generating a subweb is illustrated. At 1202, a user interface is provided to a user. The user interface can have a plurality of data entry positions, thereby allowing the user to enter data required to generate a subweb. At 1204, an appropriate name is given to a subweb to be created, thereby enabling the user and other users to easily discern which topic and/or user characteristic(s) the subweb represents. At 1206, sites (e.g., domains, paths, . . . ) that will be included within the subweb are entered into a data entry position within the user interface. The user can select these sites based on current preference, previous experience, word of mouth, search engine, or other suitable manner of selecting sites believed to be related to a particular topic/user characteristic. At 1208 the user can assign weights to the sites chosen to define the subweb. The weights can also be assigned based upon user preference, experience, etc. Furthermore, weights can be assigned after generation of the subweb based upon user history, context, etc. and other information related to the particular user. At 1210 the subweb is finalized, and is defined by the entered sites and the weights assigned to those sites. The subweb may thereafter be saved, duplicated, modified, or any other suitable action that can be undertaken on a similar object.

Figure 13:
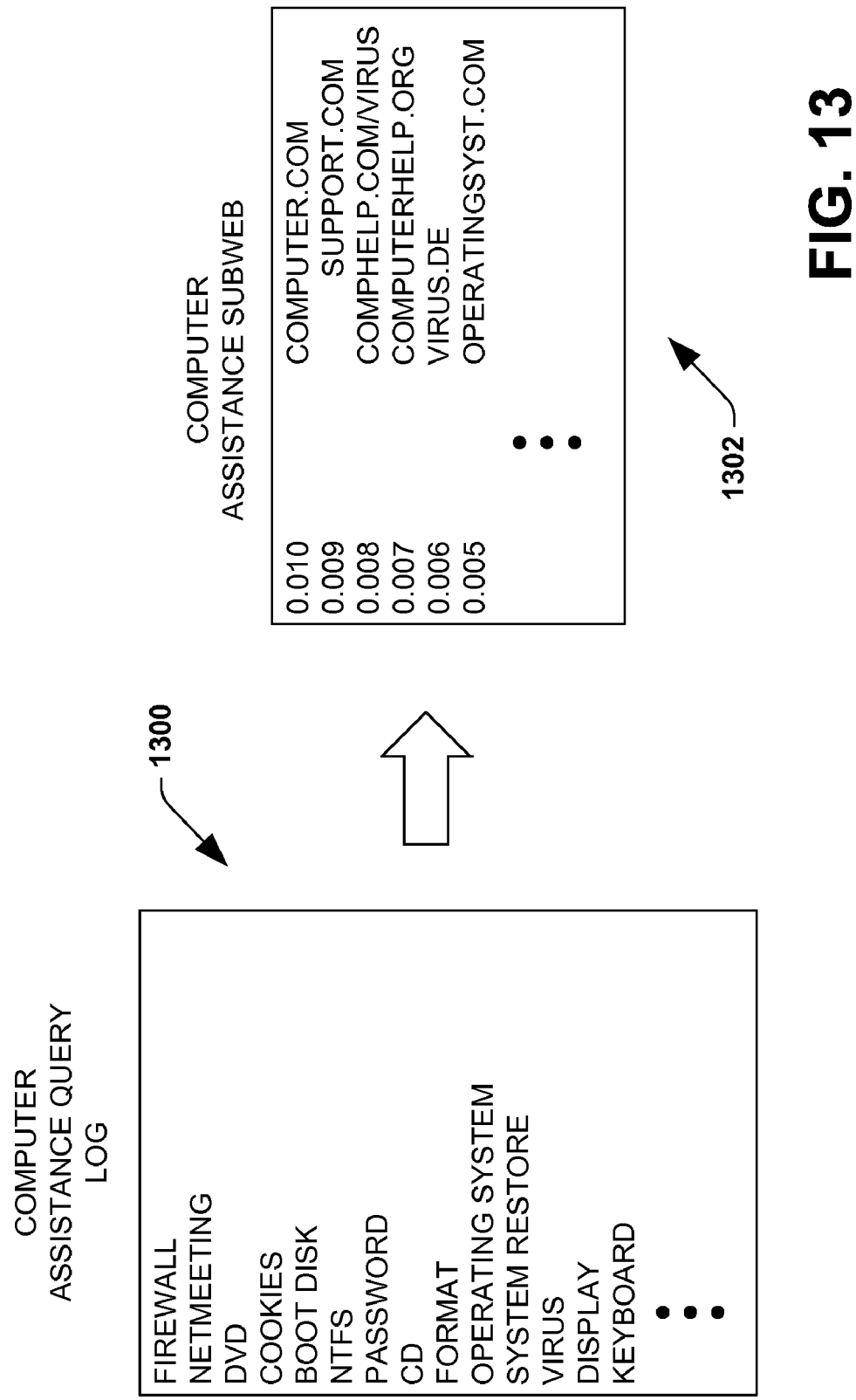
FIG. 13 illustrates an exemplary query log and an exemplary subweb generated based on the query log in accordance with an aspect of the present invention.

Now referring to FIG. 13, an exemplary query log 1300 and a resulting subweb 1302 are illustrated. The subweb 1302 was desirably created to represent a particular topic of computer-related assistance. Thus, the query log 1300 includes a plurality of search terms that are relevant with respect to the topic of computer assistance. For instance, the terms "firewall," "netmeeting," "DVD," etc. are all related to computer assistance. Each query within the query log 1300 was entered into a general search engine, and the results were provided to a subweb generator 904 (FIG. 9). The resulting subweb 1302 includes a plurality of computer-related sites with associated relevance weighting. For instance, computer.com was assigned the greatest weight (e.g., 0.01), and is thus presumptively the most relevant site when referring to the topic of computer assistance. The subweb 1302 can now be employed to focus a search over a collection of sites on the topic of computer-assistance by biasing results based at least in part upon site weights within the subweb 1302.

Figure 14:
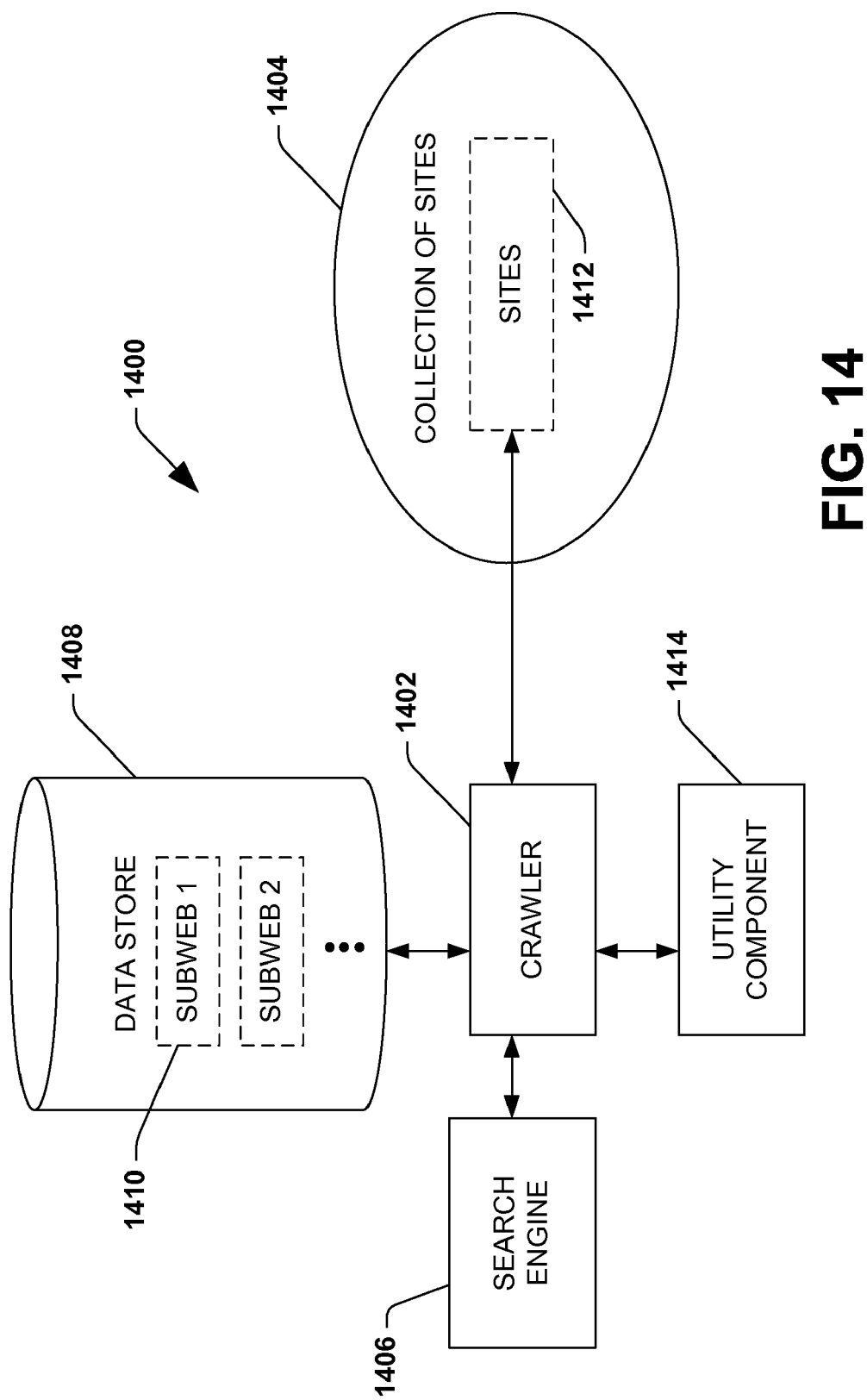
FIG. 14 is a block diagram of a system that facilitates improved web crawling in accordance with an aspect of the present invention.

Now referring to FIG. 14, a system 1400 that utilizes a crawler 1402 to locate new and/or altered sites within a collection of sites 1404 (e.g., the World Wide Web) that can be located via a search engine 1406 is illustrated. For example, the crawler 1402 can be a web crawler (e.g., a program that browses the World Wide Web in an automated and methodical manner). It is to be understood, however, that the crawler 1402 as described hereafter refers to any component that browses sites within a collection of sites. Such collection of sites can be stored on a server, a local hard drive, or any other suitable data storage location. Crawlers keep a copy of all pages visited for later processing—for example by a search engine. Crawlers also utilize these pages to facilitate narrowing of a search. For example, Internet search engines rely on web crawlers to ensure that sites that are returned during a search are still existent on the World Wide Web and are current versions of the sites.

In accordance with one aspect of the present invention, the crawler 1402 accesses a data store 1408 that includes a plurality of subwebs 1410. Each subweb includes sites related to particular topics and/or user characteristics represented by the subwebs, and corresponding sites 1412 exist within the collection of sites 1404. The topics can be as broad or as narrow as the creator of the subwebs 1410 desired at the time of creation. As the crawler 1402 has access to a list of sites that define the subwebs 1410, it can ensure that those sites 1412 are checked more frequently within the collection of sites 1404 (e.g., the World Wide Web) than sites not defining the subwebs 1410. Thus, sites in subwebs that are utilized frequently to narrow a search can be given greater priority with respect to crawling than sites outside of subwebs or sites in subwebs less frequently utilized in connection with searching. Furthermore, the crawler 1402 can be associated with a utility component 1414 that can perform a probabilistic based analysis in connection with actions taken by the crawler 1402. For example, the utility component 1414 can determine that a particular probability exists that one or more sites within the subwebs 1410 have been altered/deleted since the last instance that the web crawler visited those sites(s) 1412 within the collection of sites 1404.

Furthermore, the utility component 1414 can determine a probability that one or more inlinks and/or one or more outlinks have been added to sites defining the subwebs 1410 since the last instance that the crawler 1402 visited those site(s) 1412 within the collection of sites 1404. In accordance with another aspect of the present invention, the utility component 1414 can perform a cost/benefit analysis in connection with the crawler 1402 visiting one or more site(s) 1412 within the collection of sites 1406 that define the subweb(s) 1410. For example, the utility component 1414 can consider the cost of deploying the crawler 1402 to one or more site(s) 1412 within the collection of sites (e.g., making a site/site appear slow, allocating crawling resources to different site(s)) in connection with benefits of visiting the site(s) (e.g., ensuring that a high-traffic site remains current).

Figure 15:
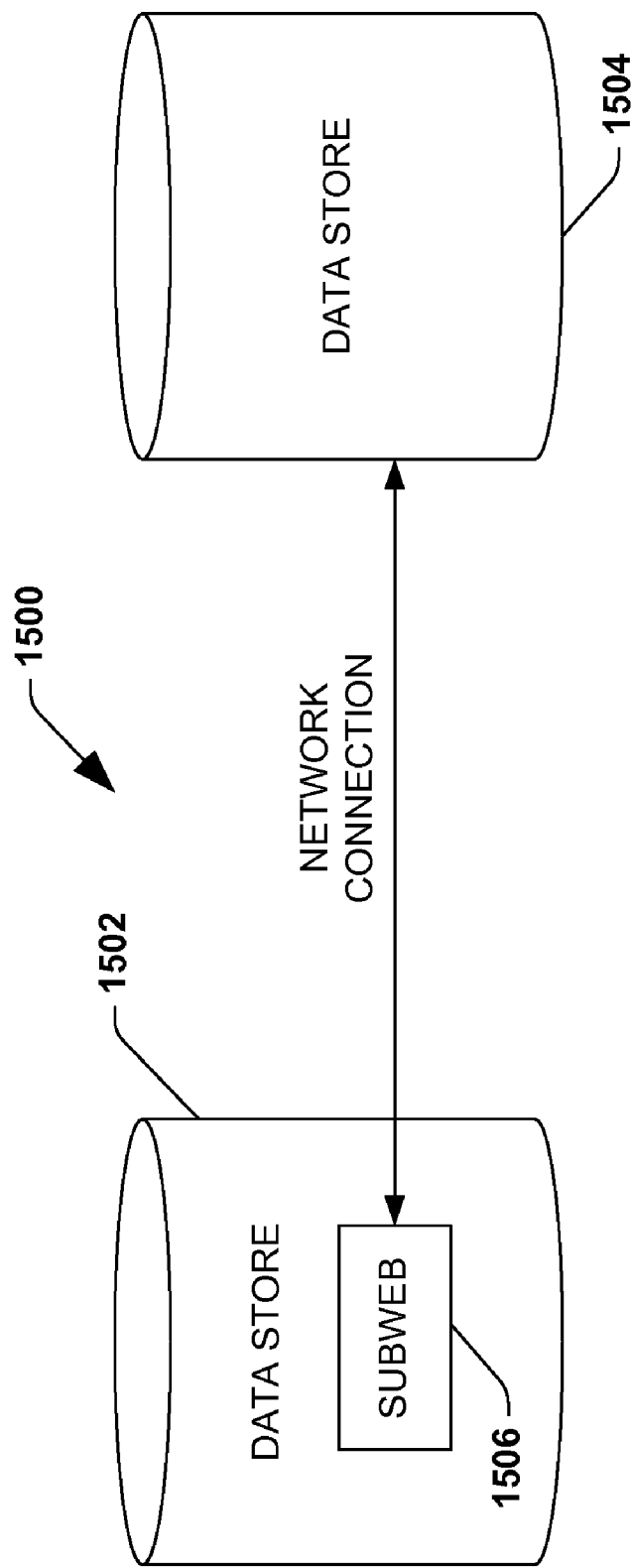
FIG. 15 illustrates the transferability of subwebs in accordance with an aspect of the present invention.

Now referring briefly to FIG. 15, an exemplary networking environment 1500 illustrating one or more benefits of the present invention is illustrated. The environment includes a first data store 1502 and a second data store 1504, wherein the first data store 1502 includes a subweb 1506 that represents a particular topic. Rather than generate a new subweb directed at a substantially similar topic, a user of the second data store 1504 desires to obtain a duplicate copy of the subweb 1502 and utilize such subweb 1502 to narrow a search. As subwebs can be thought of as objects, the user of the second data store 1504 can obtain a duplicate of the subweb 1506 existent on the first data store 1502. A duplicate of the subweb 1506 can be transferred on the network connection and received by the second data store. Furthermore, the duplicate of the subweb 1506 can be modified according to user preferences once it becomes resident within the data store 1504. Thus, subwebs provide for personalization in connection with searching a collection of sites—an important improvement over conventional searching systems and techniques.

Figure 16:
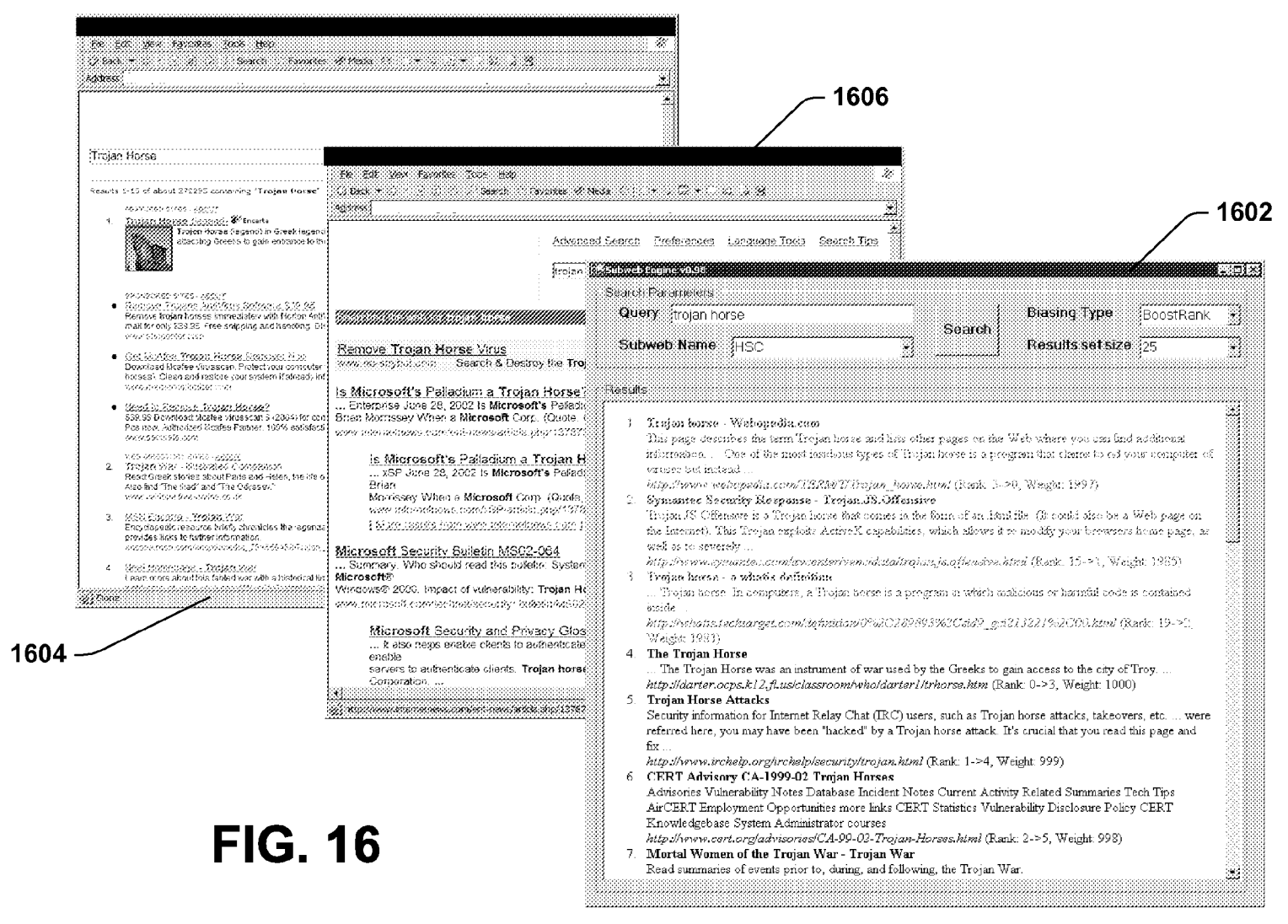

Now referring to FIG. 16, a search utilizing subwebs to focus such search is compared against searches utilizing conventional search engines. More particularly, an interface 1602 that enables a search to be focused utilizing one or more subwebs is shown, wherein a selected subweb relates to computer help and support (HSC). The search query utilized is "Trojan horse", wherein a user desires to retrieve information relating to malicious computer programs. Return results obtained via utilizing the subweb to focused such return results more highly related to a general search engine 1604 as well as a domain-specific search engine 1606 (e.g., that only searched over a Microsoft® domain). The general search engine 1604 returns irrelevant results related to history of the Trojan War. The domain specific search engine 1606 omits results that are highly related to the search.

Figure 17:
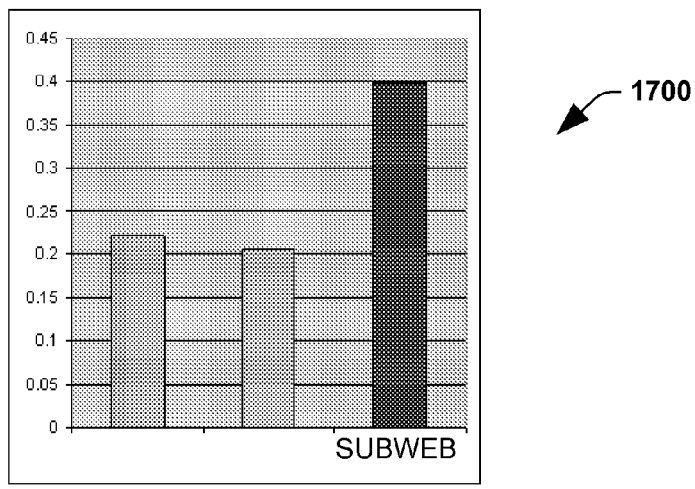
FIGS. 17 and 18 illustrate data that shows superiority of subweb-focused searches in comparison to conventional searches in accordance with an aspect of the present invention.
Figure 18:
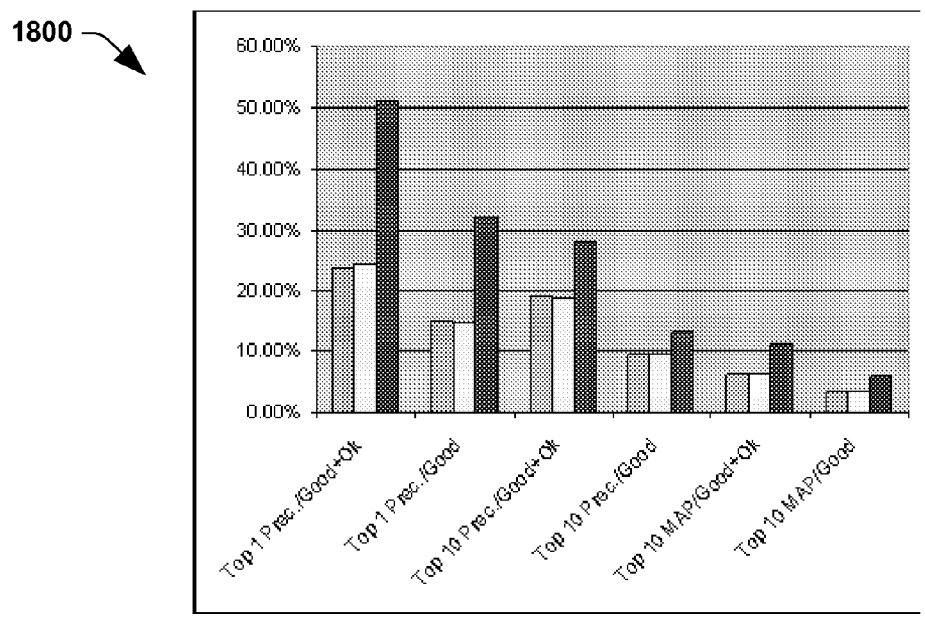

Turning now to FIGS. 17 and 18, exemplary comparisons between results obtained via subweb assisted searches and results obtained from two conventional search engines are illustrated. To measure relevance of results, a standard set of relevant results for a given set of queries was constructed, and results obtained by a subweb-assisted search and general search engine searches were compared against the standard. The subweb employed for the illustrated experiment was constructed from 450 topic-related queries, and normalized against a set of 1,000 random queries. Queries utilized to obtain results were drawn from a mixture of five hundred most frequent queries for a particular domain and five hundred random queries utilized in the same domain. For each query, the top results from each of these search providers were obtained, merged, and deduplicated. These results were then randomly sorted and presented to independent annotators. The set of queries used to construct the subweb and the set of queries used to obtain results given to the annotators were mutually exclusive.

The annotators utilized in connection with this comparison were unaware of the origin of the results (i.e., they were unable to determine whether obtained results were from a conventional search engine or a subweb focused search). The annotators evaluated results as "Good" (the result is directly relevant to the query), "OK" (the result gave some insight but didn't completely answer the question), or "Bad" (the result was of no use) with respect to a chosen topic. For example, if a desired topic were computer viruses, a returned result discussing information about the ancient city of Troy when a query for "Trojan Horse" is utilized would be an irrelevant (e.g., "Bad") result. Alternatively, information about how to prevent computer viruses would be rated as relevant. In all, 17741 results (obtained from 510 queries sent to the subweb focused search engine as well as the two conventional search engines) were annotated, using a simple annotation tool. These annotations were compiled into the standard. Once this standard was obtained, queries were run again against subweb focused search engine, and the two conventional search engines. FIGS. 17 and 18 illustrate results of such comparison.

Referring specifically to FIG. 17, a comparison 1700 that illustrates that subweb focused search results have a higher mean-reciprocal rank when compared to the two conventional search engine results. The mean-reciprocal rank describes the average location of the first result that satisfies a user's needs. Obviously, a higher mean-reciprocal rank is desirable. The mean-reciprocal rank associated with subweb-focused searches is nearly double that associated with the two conventional search engines. Turning specifically to FIG. 18, various comparisons 1800 relating to results obtained from the subweb focused search and conventional searches are illustrated. More particularly, relevancy of results obtained within the first several sites is compared between the subweb focused search and conventional searches. Subweb focused search results were consistently more relevant than conventional search engines. More particularly, the following chart illustrates data utilized to construct the comparisons 1800.

|  | Conventional1 | Conventional2 | Subwebs |
| --- | --- | --- | --- |
| Top 1 Prec./Good + Ok | 23.92% | 24.31% | 51.18% |
| Top 1 Prec./Good | 14.85% | 14.51% | 32.16% |
| Top 10 Prec./Good + Ok | 19.37% | 18.90% | 28.13% |
| Top 10 Prec./Good | 9.47% | 9.35% | 13.21% |
| Top 10 MAP/Good + Ok | 6.35% | 6.32% | 11.14% |
| Top 10 MAP/Good | 3.48% | 3.39% | 6.11% |

The above chart illustrates that the top returned result utilizing subwebs to focus the search was either annotated as "Good" or "OK" for 51.18% of searches compared with much lower numbers of other conventional search engine results. Likewise, the top returned result employing subwebs to focus the search was annotated as "Good" for 32.16% of searches. Mean Average Precision over Relevant Results (MAP) is an "average of averages" of the precision levels of relevant results of each result list. Irrelevant results do not contribute to the average precision of a result list. For both Top N precision and MAP, a larger number indicates better relevance. As can be seen from reviewing FIGS. 17 and 18 as well as the above table, subweb focused searches consistently outperform general searches.

Figure 19:
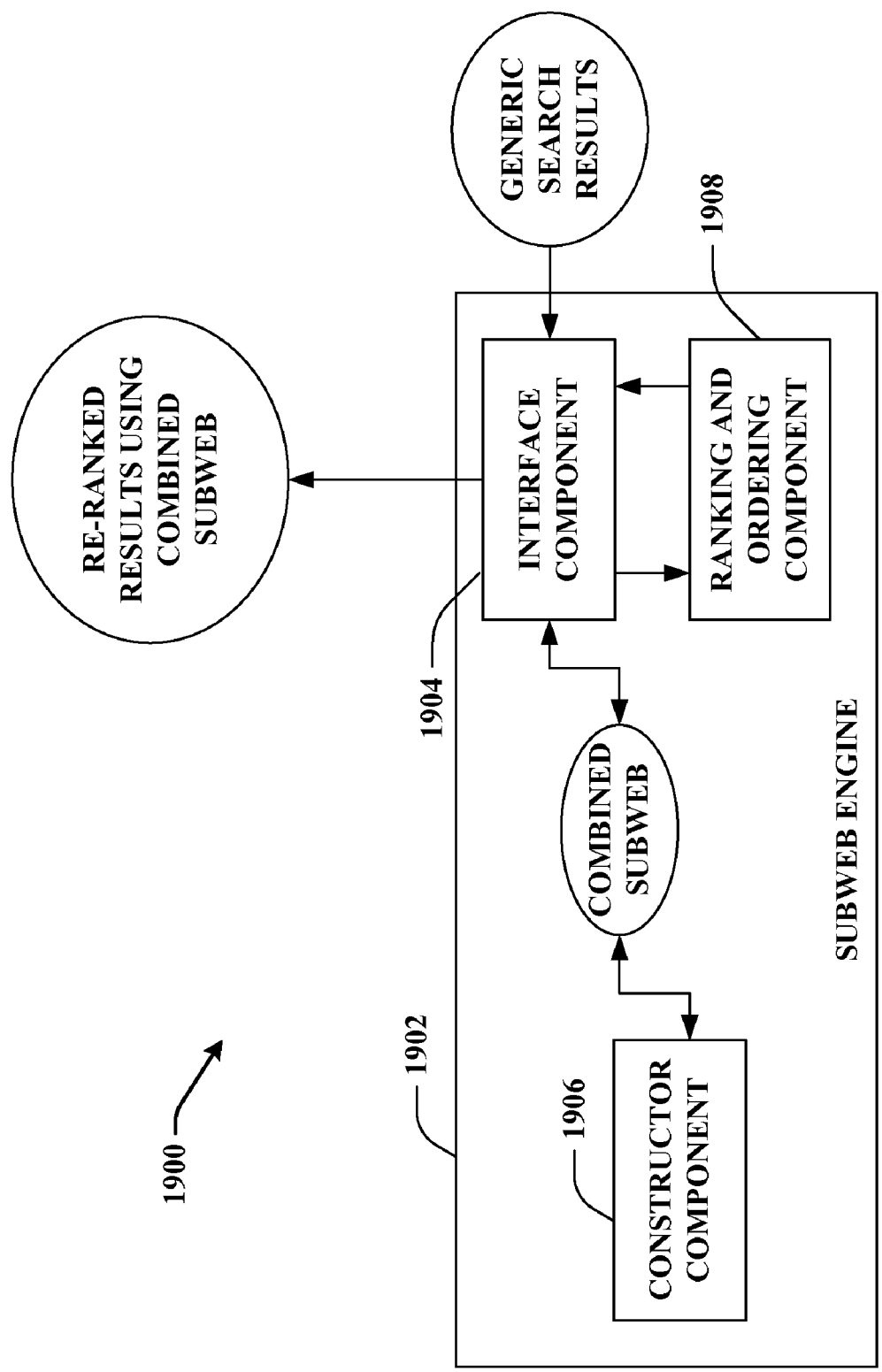
FIG. 19 provides depiction of an illustrative subweb engine that effectuates and/or facilitates combining domain-tuned search systems in accordance with an aspect of the claimed subject matter.

In accordance with a further illustrative aspect of the claimed subject matter, FIG. 19 illustrates a system 1900 that effectuates and/or facilitates combining domain-tuned search systems or subwebs. As illustrated system 1900 can include subweb engine 1902 that include interface component 1904 (hereinafter referred to as "interface 1904") that can receive and/or disseminate, communicate, and/or partake in data interchange with a plurality of disparate sources and/or components. Interface 1904 can receive as input a set of queries regarding a domain of interest (e.g., domains can be as varied as fly-fishing, Indian classical music, computer viruses, Trojan horses, and the like) elicited from an individual employing system 1900, descriptive paragraphs about domains of interest, and/or illustrative web-pages provided by individuals utilizing system 1900 outlining what it is that the individual is looking for, and that outputs conjoined or combined subwebs wherein the combined or conjoined subwebs or domain-tuned systems include multiple disparate single-focused subwebs or domain-tuned systems.

Additionally, subweb engine 1902 can also include constructor component 1906 that can create subweb definitions and utilize these definitions to rank or re-rank results received from a generic search engine. Subwebs are based on the intuition that the more often a path appears in web search results for topic-specific queries, the more relevant the path is to that topic of interest. Accordingly, in accordance with an aspect of the claimed subject matter, constructor component 1906 can identify the most frequent or commonly occurring paths in the result set of queries from a topic-specific log along with paths from the neighborhood of these results, for example.

Constructor component 1906 can facilitate the foregoing object by computing result path distributions where queries from topic-specific query logs are sent to a generic search engine, and a frequency of paths in the search result set is computed. A set of seed Uniform Resource Locators (URLs) or site paths (e.g., http://www.somewhere.com/something-forfreesite), key phrases extracted from relevant documents or even key phrases specific to individual users can be used instead of query log. Further, constructor component 1906 can compute neighborhood path distribution. Here constructor component 1906 computes the one-link path neighborhood of the result set from sites that are one link away: the Uniform Resource Locators (URLs) that the result sites point to ("outlinks"), and the Uniform Resource Locators (URLs) that point to the result set sites ("inlinks"). With some thresholding on the number of inlinks and outlinks used, the frequency of paths in the resulting neighborhood can be computed. More generally, this can be computed for an N-link neighborhood (N representing an integer). Additionally, constructor component 1906 can determine net path distributions by adding the frequency of path neighborhood to the result frequency with some differential weighting, and further can normalize these against a baseline. A normalized distribution typically can be obtained by computing the net path distribution for a topic-specific query log, and subtracting the net path distribution for a baseline (random) set of queries. This normalization can reduce the noise due to highly linked sites, and some advertising sites. The subweb definition, which is essentially a set of paths with weights proportional to their significance to the topic, can then be derived or ascertained from the normalized distribution.

If it is assumed that users typically specify a query and the topic of their query, or alternatively, that the topic of the query can be implicitly inferred from a search entry point, the subweb definition corresponding to the search topic can be used to rank or re-rank the search results obtained from a search engine thereby providing ordered categorizations.

Additionally, constructor component 1906 can combine two or more subwebs to obtain a more powerful and focused subweb. Generally speaking, most users are not one-dimensional in their searches, they do not incessantly initiate searches on just one topic; rather most users have varied but focused interests. For example, a user may be interested in pre-Columbian civilizations (e.g., Toltec, Aztec, Inca, Maya, etc.) and solutions for Fermat's Last Theorem. In this case two distinct search subwebs can be constructed by constructor component 1906 as outlined above (e.g., a subweb definition that includes appropriate paths and weights associated with the paths for each search topic can be computed). Once the individual subwebs have been computed they can be combined by utilizing the weights associated with each of the site URLs (or paths, which typically can be substrings of the URLs) in the respective subwebs. For instance, if the subweb associated with pre-Columbian civilizations yields three sites A, B, and C with weights A1, B1, and C1, and the subweb associated with Fermat's Last Theorem yields the same sites A and B but with weights A2 and B2 as well as another site D with weight D2, the two subwebs can be joined by adding the weights. So the combined subweb can include sites A, B, C, and D with weightings A1+A2, B1+B2, C1, and D1, respectively. Here, the mere addition of the weights does not take into account the fact that the pre-Columbian civilization subweb may have had thousands of site URLs associated with it while the subweb associated with Fermat's Last Theorem may have had very few. Therefore the weights need to be normalized accordingly so as to ensure that the weights from the pre-Columbian civilization subweb are given more credence over the weights associated with Fermat's Last Theorem. It should be noted that while the claimed subject matter utilizes addition to combine the weights from respective subwebs to construct a "super" subweb or a domain-tuned system comprising multiple subwebs, other techniques, such as utilizing the average, median, mode, product, discarding high and low weightings, and the like, can be used with equal effect and utility. In general, the claimed matter can use any function on the weights from the different subwebs to construct a new subweb. Accordingly, any and all of these techniques for providing an appropriate weighting structure to conjoin multiple subwebs will fall within the ambit and spirit of the claimed subject matter.

Moreover, subweb engine 1902 can include ranking and ordering component 1908 that can be linked to interface component 1904. Ranking and ordering component 1908 can automatically and/or dynamically utilize a ranked list of websites obtained from a generic search engine together with a weighted list associated with a subweb definition obtained from a definition component (see FIG. 20) to facilitate and/or effectuate a re-ranking of the list of websites. In this manner, websites of particular relevance to a topic of interest can be surfaced or bubbled to the top of the list (e.g., the top indicative of the most relevant results, though as will be appreciated the claimed subject matter is not so limited) while websites with little relevance can be sifted down the relevance scale and commensurately down the list.

Figure 20:
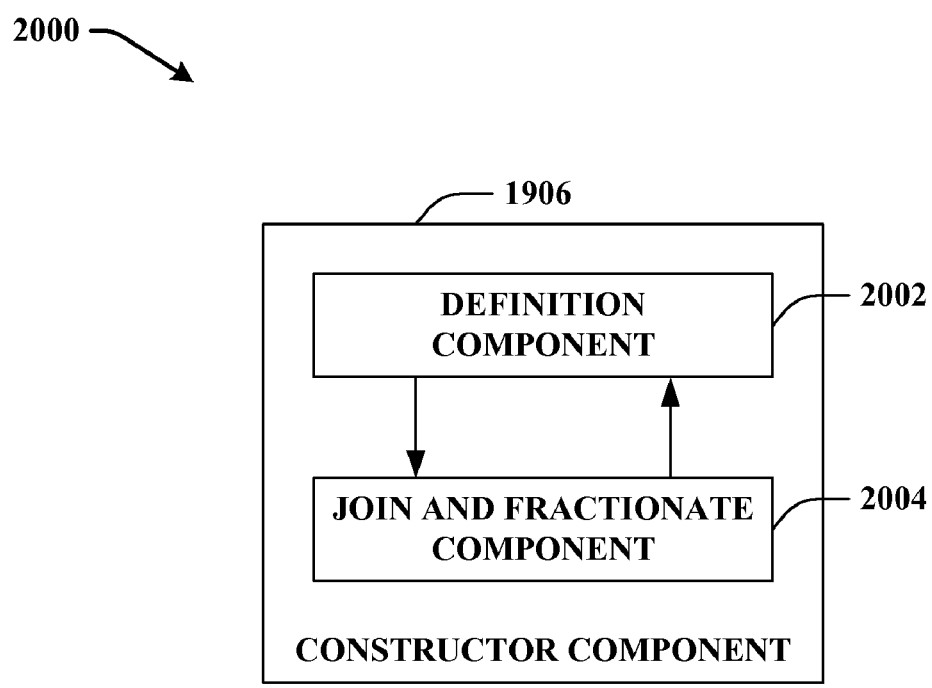
FIG. 20 provides a more detailed depiction of an illustrative constructor component that effectuates and/or facilitates combining domain-tuned search systems in accordance with an aspect of the claimed subject matter.

FIG. 20 provides a more detailed depiction of an illustrative constructor component 1906 in accordance with an aspect of the claimed subject matter. As illustrated, constructor component 1906 can include definition component 2002 that can receive inputs elicited from the user or individuals utilizing subweb engine 1902 to obtain pertinent subwebs. Definition component 2002 can utilize lists of queries, written descriptions, sample web-pages exemplifying items or topics that the individual wishes to search for to develop a subweb definition. The subweb definition developed by definition component 2002 can be a set of putative, tentative, or presumptive websites related to an area of interest (e.g., definition component 2002 can employ artificial intelligence or machine learning modalities to infer or assume that certain sites are more relevant to a topic or area of interests than others) represented as a set of Uniform Resource Locators (URLs). Each of the websites identified by definition component 2002 can be associated with a weight (e.g., definition component 2002 can also utilize artificial intelligence or machine learning techniques to appropriately weight associated Uniform Resource Locators (URLs)).

Users typically are not one-dimensional in their interests and accordingly it would be oversight to assume that a single directed subweb would satisfy all their interests and search requirements or that their interests will remain static over time. Thus, in addition to definition component 2002, constructor component 1906 can include join and fractionate component 2004 that can either join or split subwebs as necessary. Join and fractionate component 2004 can utilize the subwebs constructed through the facilities of definition component 2002 to either conjoin two subwebs to produce a "super" subweb or disassemble a "super" subweb into smaller more directed, focused, or targeted subwebs. Join and fractionate component 2004 can utilize the weights associated with paths included in the subweb (e.g., where a join is to take place the weights associated with the multiple subwebs that are to be joined; conversely where a "super" subweb is to be dismantled into multiple constituent subwebs typically the weights included or associated with paths that form the single "super" subweb) to combine subwebs or break down the "super" subweb. For instance, to construct a "super" subweb from multiple subwebs, the weighting of the sites included in each of the multiple subwebs can be added to one another and normalized to provide new weightings with respect to each of the multiple subwebs being joined together. Conversely, where a "super" subweb is to be broken down or split associated weights can be subtracted from one another and a normalization process carried out once again in order to provide an accurate reconstruction of the individual subwebs.

Figure 21:
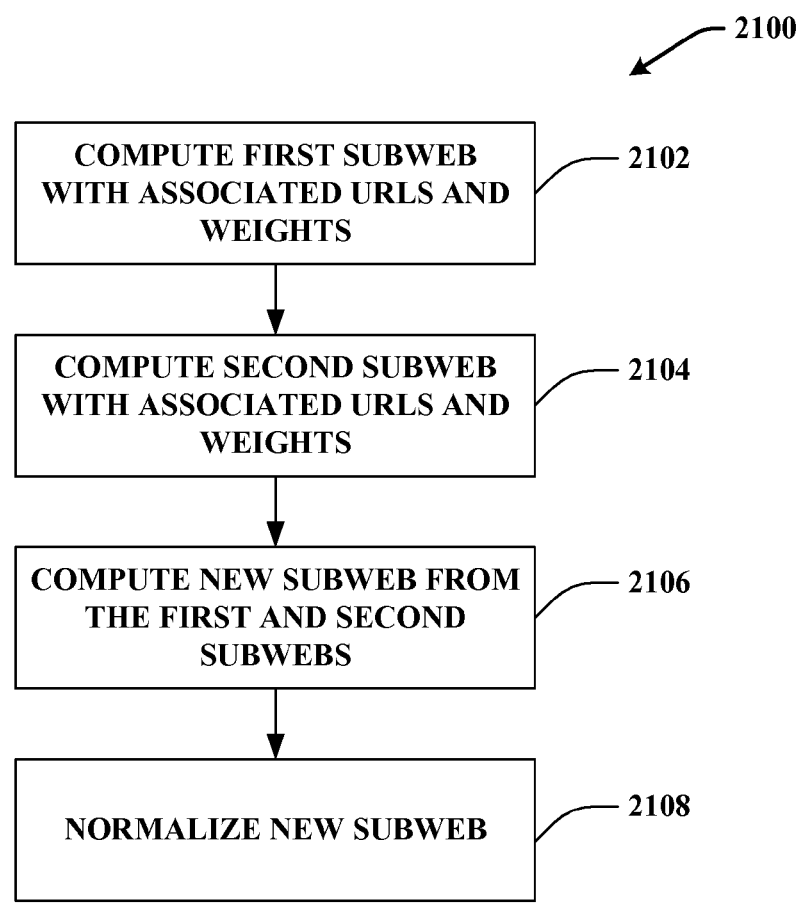
FIG. 21 illustrates a flow diagram of a machine implemented methodology that effectuates and facilitates combining domain-tuned search systems in accordance with an aspect of the claimed subject matter.

In view of the illustrative systems shown and described supra, methodologies that may be implemented in accordance with the disclosed subject matter will be better appreciated with reference to the flow chart of FIG. 21. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 21 illustrates a machine implemented method 2100 that effectuates and facilitates combining domain-tuned search systems in accordance with an aspect of the claimed subject matter. Methodology 2100 can commence at 2102 where a first subweb can be computed, the subweb will typically comprise a list of website names, associated paths and/or weights assigned or associated to each of the website names. Similarly, another subweb including lists of website names, associated paths and/or weights assigned or associated with each website name or paths can be computed at 2104. At 2106 the first and second subwebs can be utilized to compute a new subweb (e.g., the weights from the two or more subwebs can be added together and assigned to the appropriate website names or Uniform Resource Locators (URLs) to comprise a "super" subweb). At 2108 the weights can be normalized to reflect the relative influence or credence that the weightings from one subweb should be attributed over the other(s). Based at least in part on the normalized weightings the website names or Uniform Resource Locators (URLs) associated with the website names can be ordered or ranked thereby bringing to the fore the most relevant items at the confluence of the two or more previously separate subwebs.

It should be noted with respect to method 2100 presented above that while this method has been explicated in terms of only two subwebs being joined, it will be appreciated by those of ordinary skill in the art that the method can have applicability when multiple subwebs need to be conjoined with one another.

Figure 22:
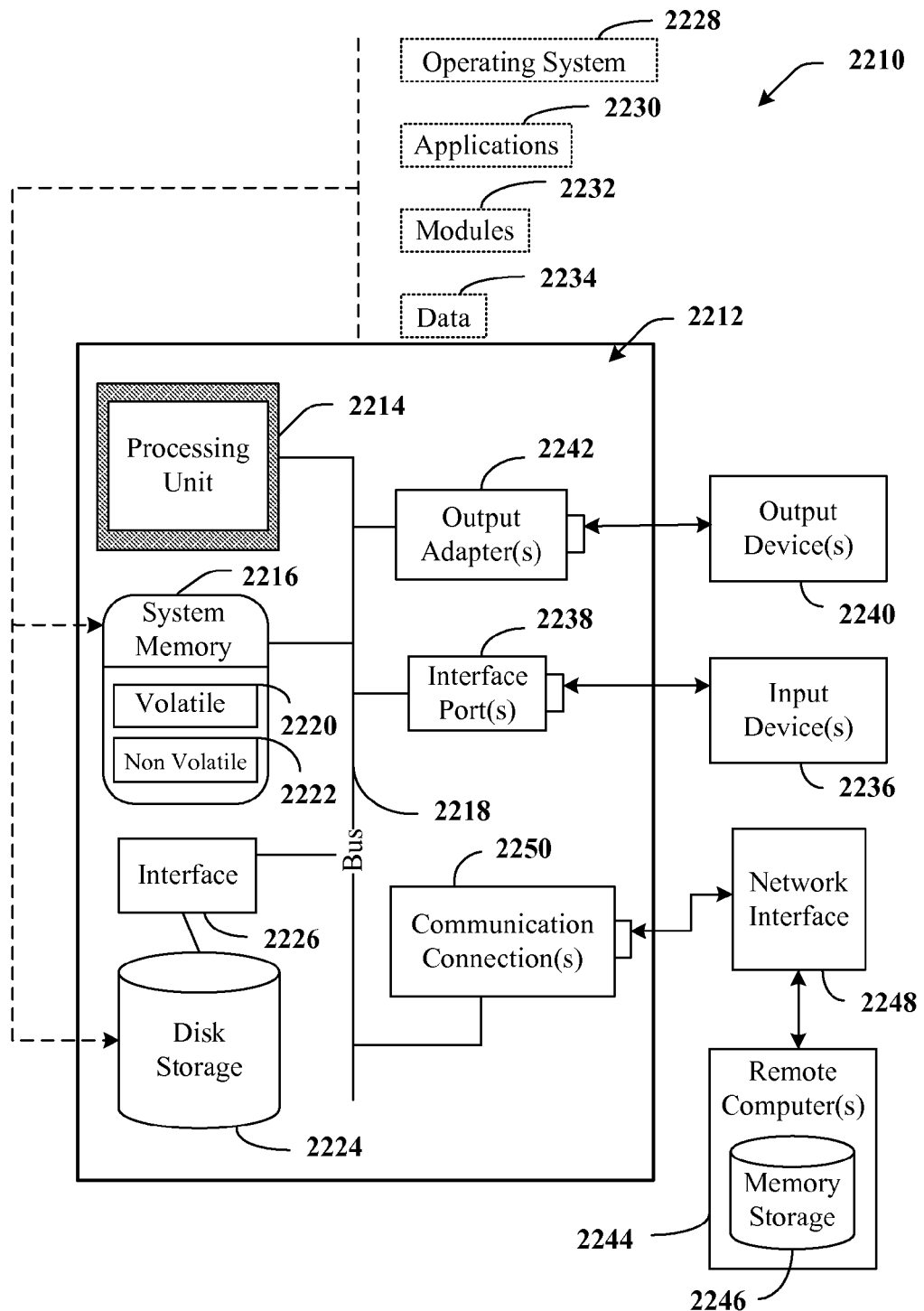
FIG. 22 illustrates an example-operating environment in which the present invention can function.

With reference to FIG. 22, an exemplary environment 2210 for implementing various aspects of the invention includes a computer 2212. The computer 2212 can be any suitable computing device (e.g., a personal digital assistant, laptop computer, server, desktop computer, . . . ) The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable ROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/nonremovable, volatile/nonvolatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer system 2212. System applications 2230 take advantage of the management of resources by operating system 2228 through program modules 2232 and program data 2234 stored either in system memory 2216 or on disk storage 2224. It is to be appreciated that the present invention can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapter 2242 is provided to illustrate that there are some output devices 2240 like monitors, speakers, and printers among other output devices 2240 that require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

Figure 23:
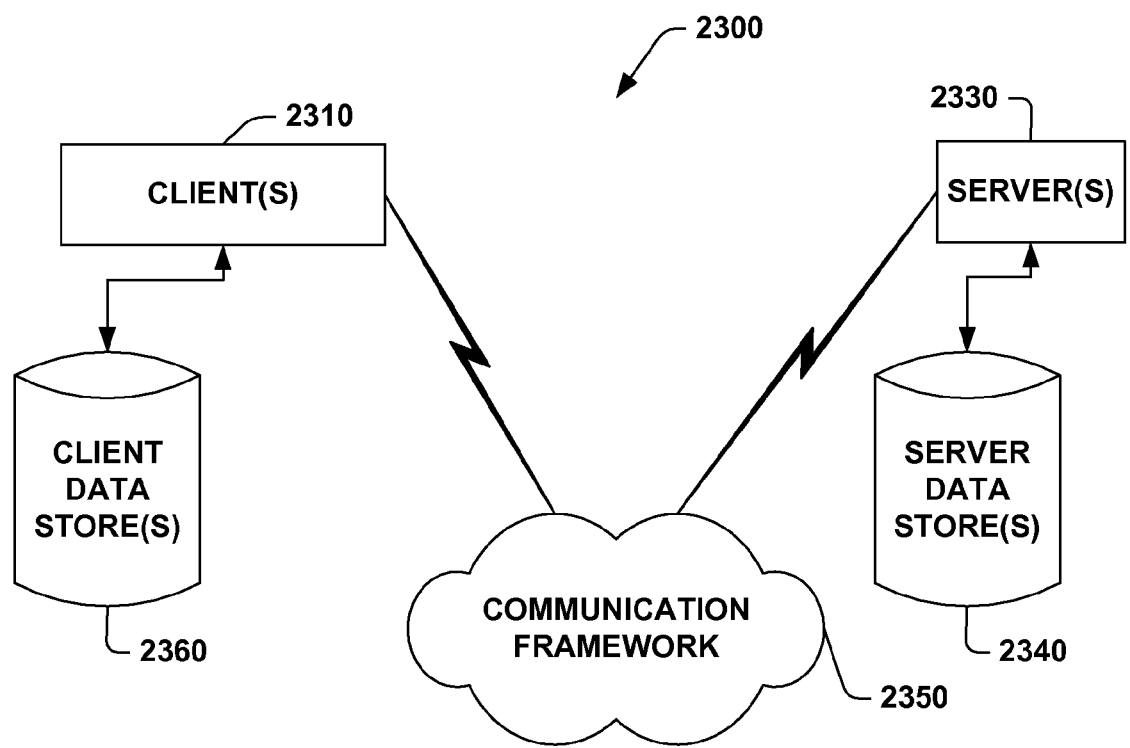
FIG. 23 illustrates another example operating environment in which the present invention can function.

FIG. 23 is a schematic block diagram of a sample-computing environment 2300 with which the present invention can interact. The system 2300 includes one or more client(s) 2310. The client(s) 2310 can be hardware and/or software (e.g., threads, processes, computing devices). The system 2300 also includes one or more server(s) 2330. The server(s) 2330 can also be hardware and/or software (e.g., threads, processes, computing devices). The servers 2330 can house threads to perform transformations by employing the present invention, for example. One possible communication between a client 2310 and a server 2330 may be in the form of a data packet adapted to be transmitted between two or more computer processes. The system 2300 includes a communication framework 2350 that can be employed to facilitate communications between the client(s) 2310 and the server(s) 2330. The client(s) 2310 are operably connected to one or more client data store(s) 2360 that can be employed to store information local to the client(s) 2310. Similarly, the server(s) 2330 are operably connected to one or more server data store(s) 2340 that can be employed to store information local to the servers 2330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that effectuates and facilitates combining domain-tuned search systems, comprising:
    a processor coupled to one or more components;
    a first component that receives, regarding a first domain of interest, at least one of:
        a list of queries,
        a written description, or
        a list of web-pages; and
    a second component that:
        automatically parses the received at least one of:
            the list of queries regarding the first domain of interest to generate a subweb definition,
            the written description regarding the first domain of interest to generate the subweb definition, or
            the list of webpages regarding the first domain of interest to generate the subweb definition, and
        utilizes the subweb definition or a list of ranked Uniform Resource Locators (URLs) to identify an existing first subweb;
    the system determines a normalized net path distribution of the first subweb by adding a frequency of a path to a result frequency with differential weighting to compute the net path distribution regarding the first domain of interest, and normalizes the net path distribution regarding the first domain of interest against a baseline by subtracting the net path distribution for a baseline set of queries to reduce noise due to highly linked sites and/or advertising sites;
    the existing first subweb combined with an existing second subweb associated with a second domain of interest; and
    the combined first subweb and second subweb being presented to a user as part of a domain-tuned system associated with the first domain of interest and the second domain of interest.

2. The system of claim 1, the definition includes a first path associated with a first website pertinent to the first domain of interest and a weight regarding a comparative relevance of the first path associated with the first website with a second path associated with a second website pertinent to the second domain of interest.

3. The system of claim 2, the second component ranks the first path and the second path based at least in part on the weight regarding the comparative relevance of the first path associated with the first website with the second path associated with a second website.

4. The system of claim 1, the list of ranked Uniform Resource Locators (URLs) obtained in response to a search of a network topology that is categorized according to a previous classification that is unrelated and distinct from the first domain of interest.

5. The system of claim 1, the second component locates a correspondence between a path included in the definition and a Uniform Resource Locator (URL) included in the list of ranked Uniform Resource Locators (URLs).

6. The system of claim 1, the second component generates a definition by identifying a frequency with which a path occurs in a search of a network topology.

7. The system of claim 6, the second component generates a definition by utilizing a topic specific log at least one of created or appended to by the search of the network topology.

8. The system of claim 6, the second component determines the frequency with which a path occurs in the search of the network topology based at least in part on a result path distribution.

9. The system of claim 8, the result path distribution determined based at least in part on a query specific to the first domain of interest being utilized to initiate the search of the network topology and a frequency of occurrence of paths that are returned by the search of the network topology.

10. The system of claim 1, the second component computes a one-link neighborhood path distribution based at least in part on paths that are one link away from one of the Uniform Resource Locators (URLs) included in the list of ranked Uniform Resource Locators (URLs) received in response to a search of a network topology to obtain the normalized distribution upon which the subweb definition is further based.

11. A machine implemented method that effectuates combining domain-tuned search systems, comprising:
  acquiring a list of queries regarding a first domain of interest;
  parsing respective paths of the queries from the list of queries regarding the first domain of interest;
  generating a subweb definition based at least on the parsing, the generating the subweb definition including employing machine learning to infer that a selection of sites is more relevant to the first domain of interest than other sites, and the subweb definition comprising the selected sites;
  locating an established first subweb based at least in part on the subweb definition, wherein a subweb is defined by a plurality of sites with relevance to at least one of a topic or user characteristic represented by the subweb, each site of the plurality of sites being assigned a relevance weight that indicates relevance of each site to the respective at least one of the topic or the user characteristic, the relevance weight being determined based at least on a distribution path associated with each site, the distribution paths being determined based at least on:
    a number of instances the site was returned as a result of disparate search-word queries, and
    inlinks and outlinks related to the site;
  combining the first subweb with a second subweb associated with a second domain of interest, the second domain of interest being disparate from the first domain of interest; and
  presenting the combined first and second subweb as part of a domain-tuned system associated with the first domain of interest and the second domain of interest.

12. The method of claim 11, the subweb definition includes a path associated with a first website pertinent to the domain of interest and a weight regarding a comparative relevance of the path associated with the first website with a second path associated with a second website pertinent to the first domain of interest.

13. The method of claim 11, further comprising a list of ranked Uniform Resource Locators (URLs) having been obtained in response to the search categorized according to a previous classification unrelated to the first domain of interest.

14. The method of claim 11, further comprising identifying a correspondence between a path included in the subweb definition and a Uniform Resource Locator (URL) included in a list of ranked Uniform Resource Locators (URLs).

15. The method of claim 11, the generating the subweb definition further including creating a definition by identifying a frequency with which a path occurs in a search of a network topology.

16. The method of claim 11, further comprising determining a one-link neighborhood path distribution based at least in part on paths that are one link away from one Uniform Resource Locator (URL) included in a list of ranked Uniform Resource Locators (URLs) received in response to a search of a network topology.

17. The method of claim 11, the generating the subweb definition further including:
  determining a normalized net path distribution by adding a frequency of a path being parsed to a result frequency with differential weighting to compute the net path distribution for the list of queries regarding the first domain of interest, and
  normalizing the net path distribution for the list of queries regarding the first domain of interest against a baseline by subtracting the net path distribution for a baseline set of queries to reduce noise due to highly linked sites and/or advertising sites.

18. A computer storage medium having computer-executable instructions encoded thereon, the computer-executable instructions configured to program a computer to perform operations comprising:
  parsing a list of queries, a written description, or a list of web-pages each regarding a domain of interest;
  generating a definition based at least on results from the parsing by:
    adding a frequency of paths from the list of queries being parsed to a result frequency with differential weighting to compute a net path distribution for the list of queries regarding the domain of interest, and
    normalizing the net path distribution for the list of queries regarding the domain of interest against a baseline by subtracting the net path distribution for a baseline set of queries to reduce noise due to highly linked sites and/or advertising sites;
  identifying a first subweb based at least in part on the definition;
  removing the first subweb from a second subweb associated with a second domain of interest; and
  displaying a reduced subweb as part of a domain-tuned system associated with the domain of interest and the second domain of interest.

19. The computer storage medium as recited in claim 18, wherein the operations further comprise determining a correspondence between a path that is included in the definition and a Uniform Resource Locator (URL) that is included in a list of ranked Uniform Resource Locators (URLs).

20. The computer storage medium as recited in claim 18, wherein the operations further comprise ascertaining a one-link neighborhood path distribution based at least in part on paths that are one link away from one Uniform Resource Locator (URLs) included in a list of ranked Uniform Resource Locators (URLs) that was previously received in response to a search of a network topology.

* * * * *